Figure 1:
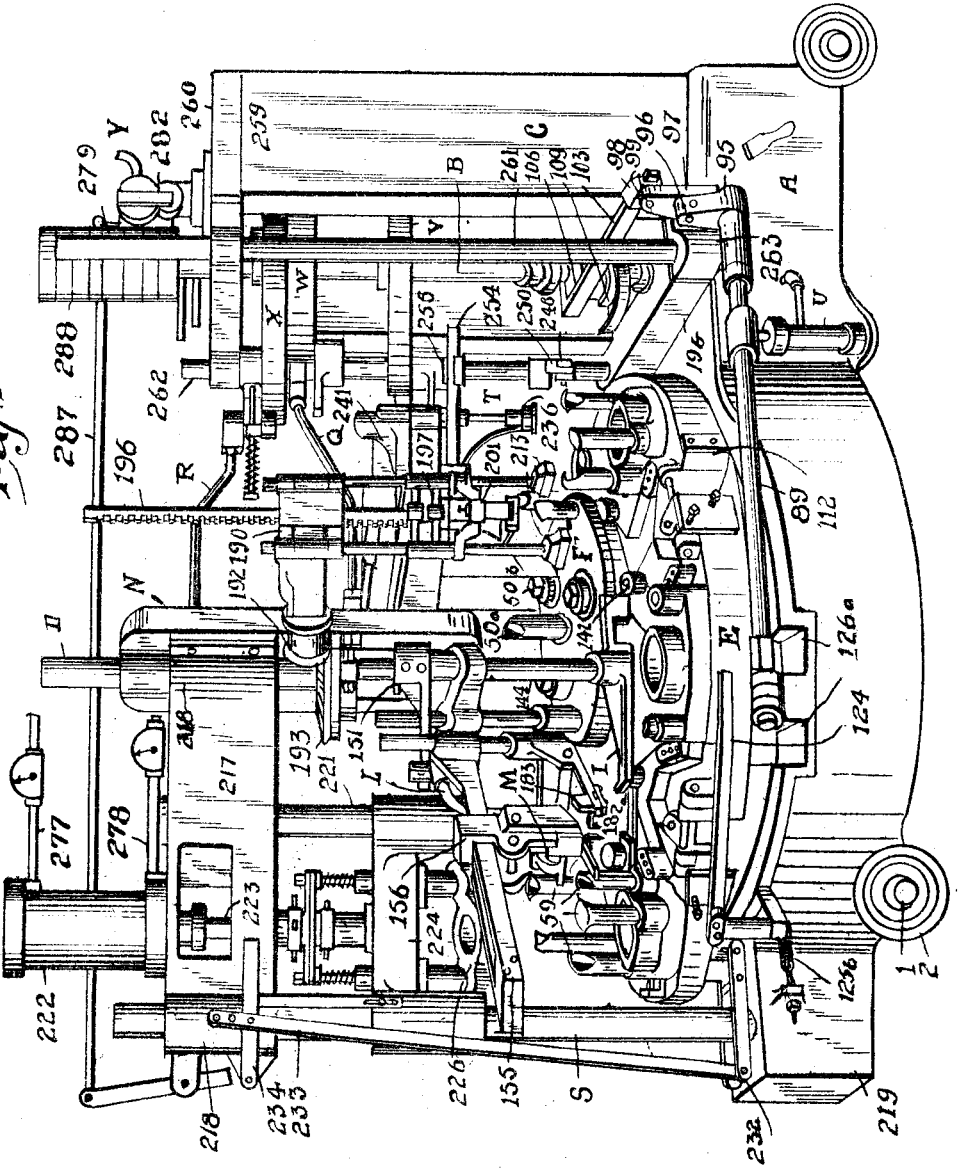

Jan. 29, 1929.

W. J. MILLER 1,700,326

GLASS FABRICATING MACHINE

Filed Dec. 26, 1922

13 Sheets-Sheet 1

WITNESS

INVENTOR

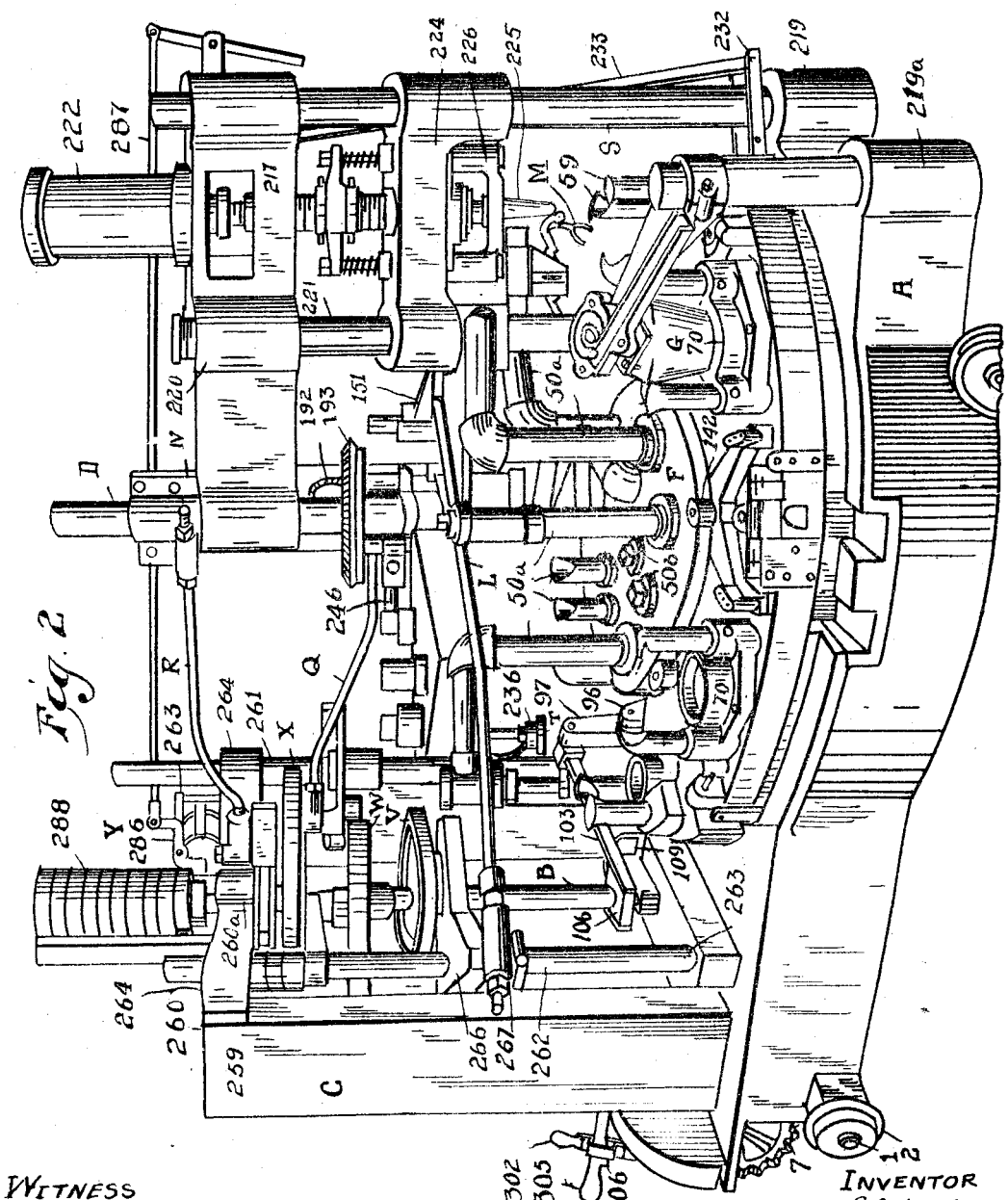

Jan. 29, 1929.　　　　　　W. J. MILLER　　　　　　1,700,326
GLASS FABRICATING MACHINE
Filed Dec. 26. 1922　　13 Sheets-Sheet 3
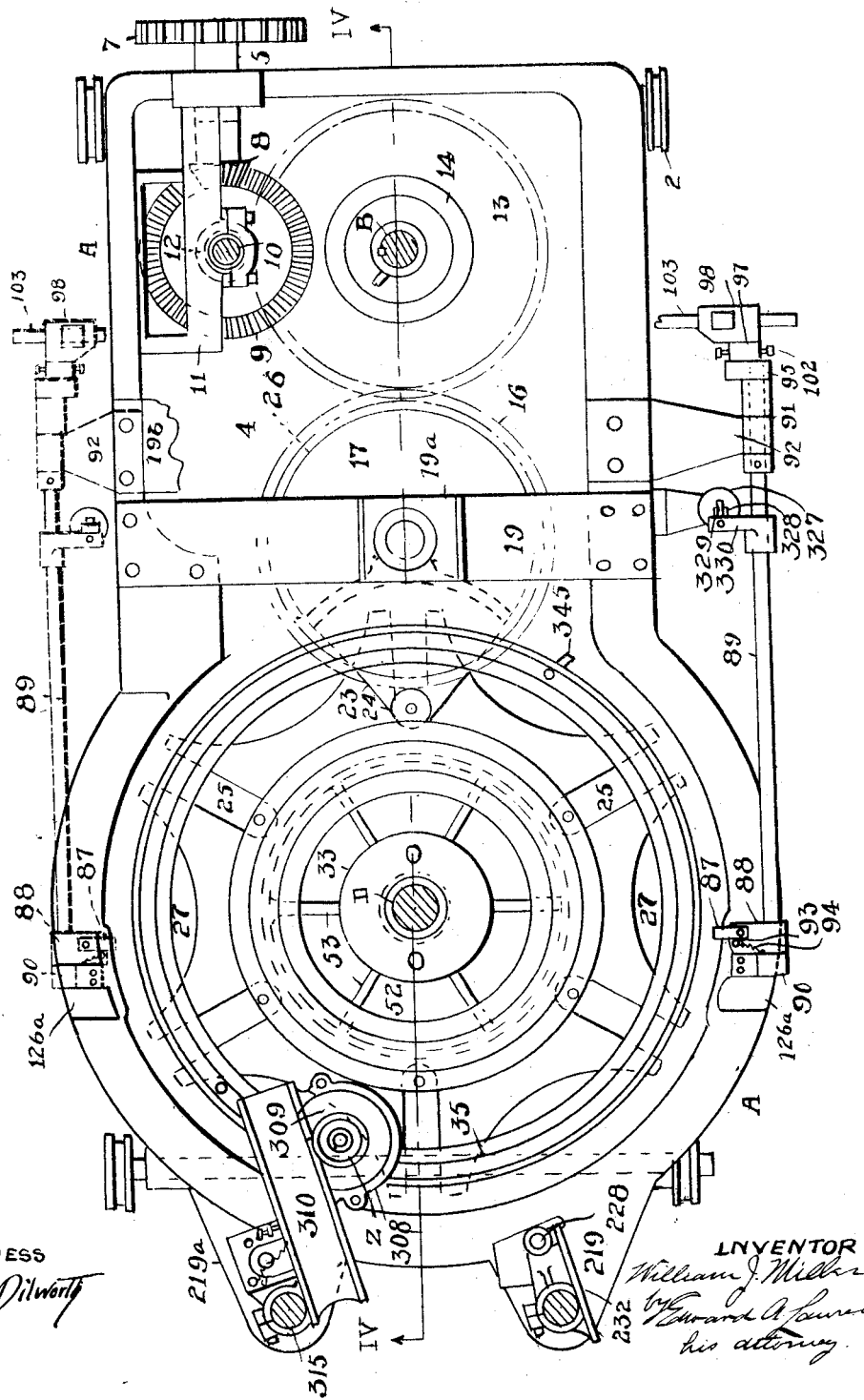

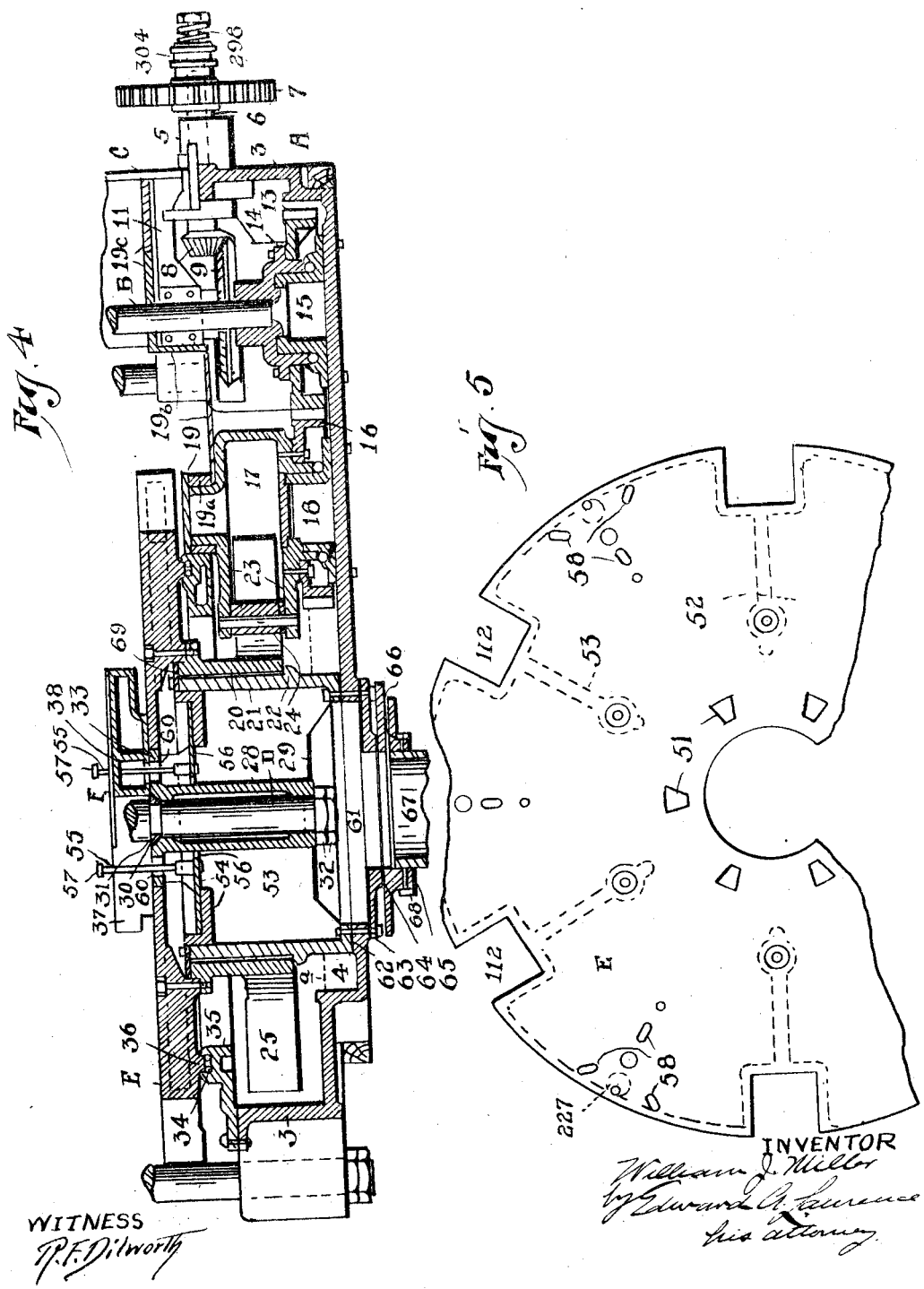

Jan. 29, 1929.  W. J. MILLER  1,700,326
GLASS FABRICATING MACHINE
Filed Dec. 26, 1922   13 Sheets-Sheet 5
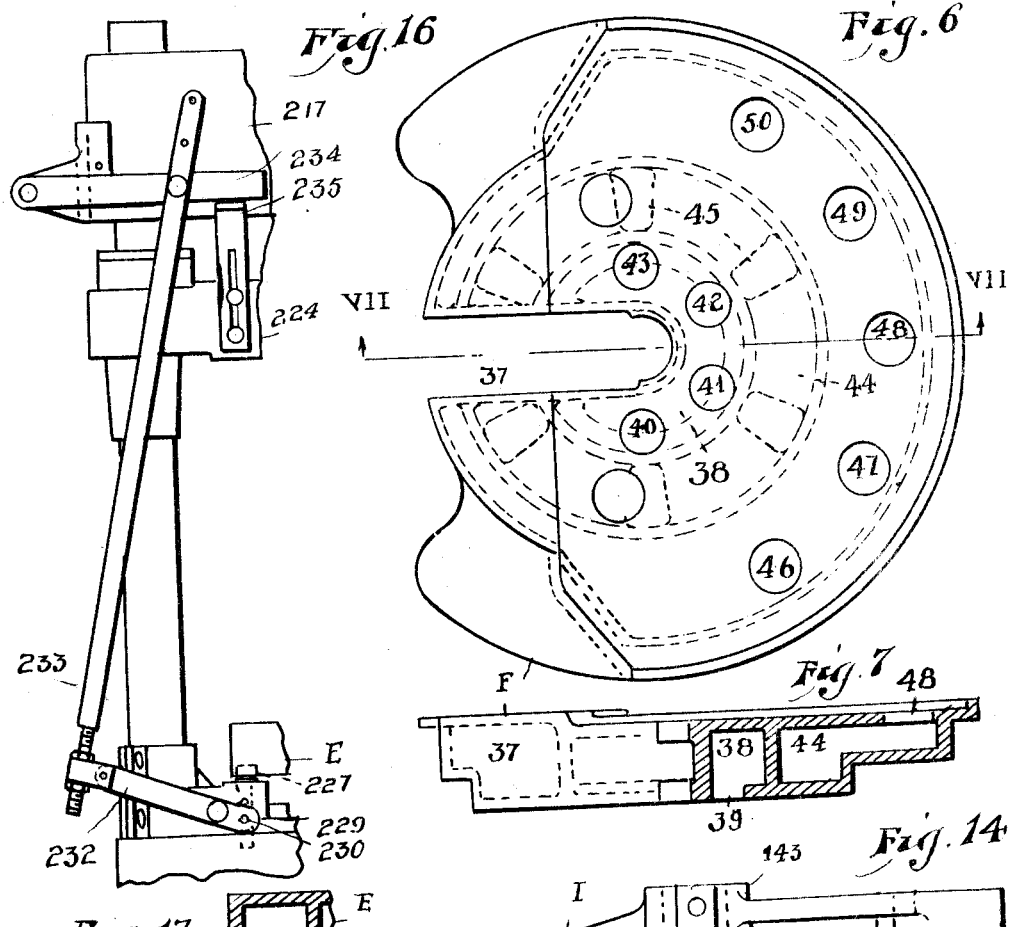
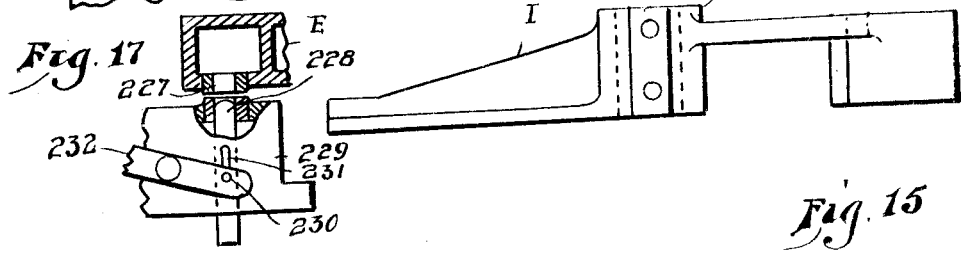
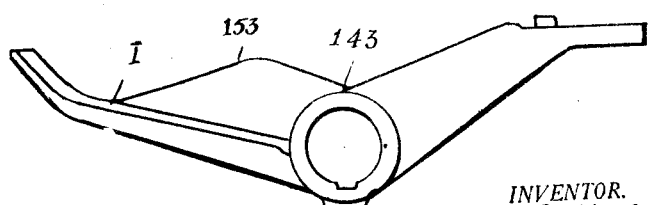
WITNESS
R. F. Dilworth
INVENTOR.
William J. Miller
BY Edward G. Lawrence
his ATTORNEY Jan. 29, 1929.
W. J. MILLER
1,700,326
GLASS FABRICATING MACHINE
Filed Dec. 26, 1922     13 Sheets-Sheet 6
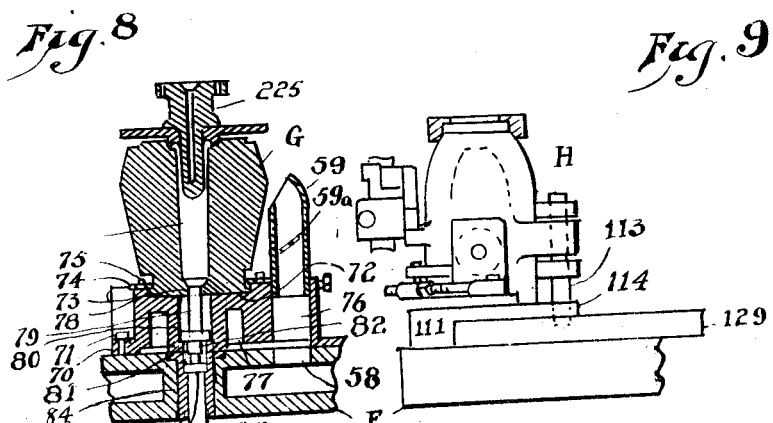
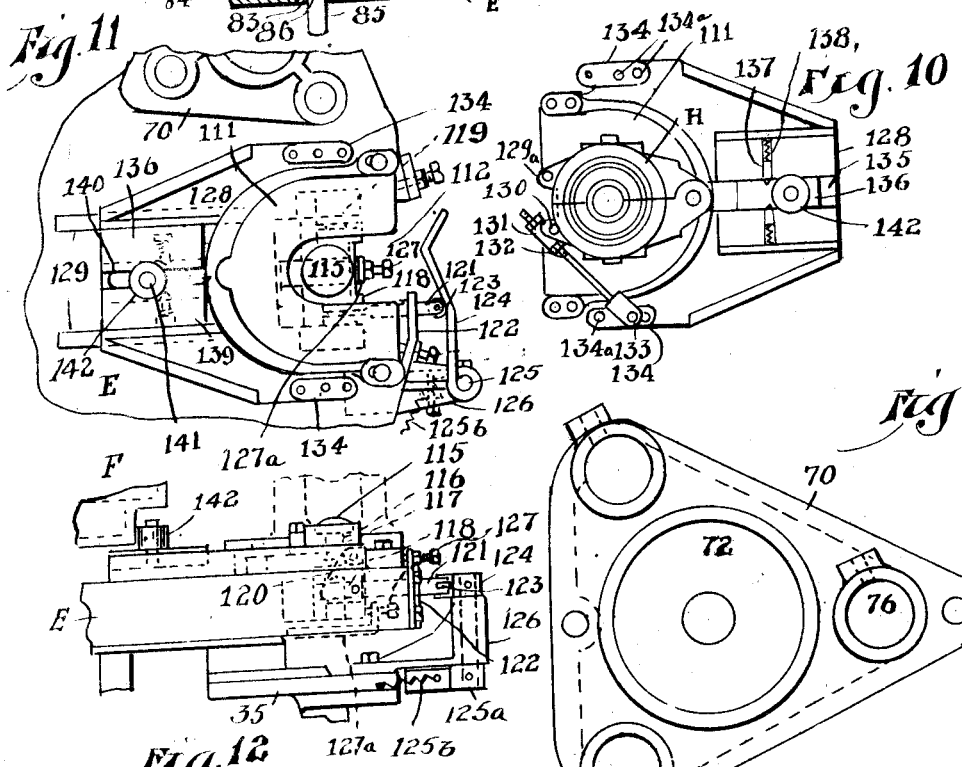
WITNESS
INVENTOR

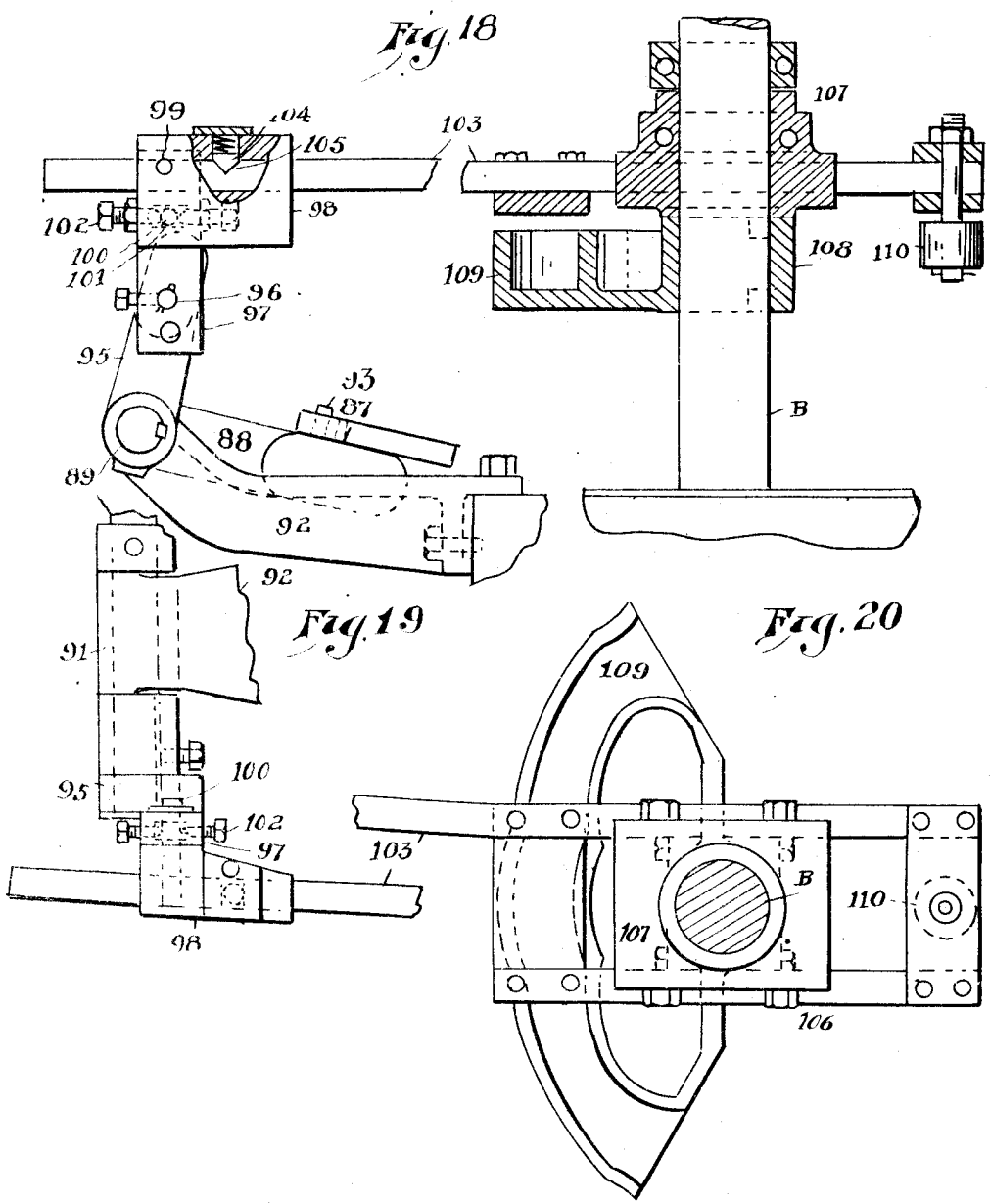

Jan. 29, 1929.                    1,700,326
W. J. MILLER
GLASS FABRICATING MACHINE
Filed Dec. 26, 1922          13 Sheets-Sheet 8
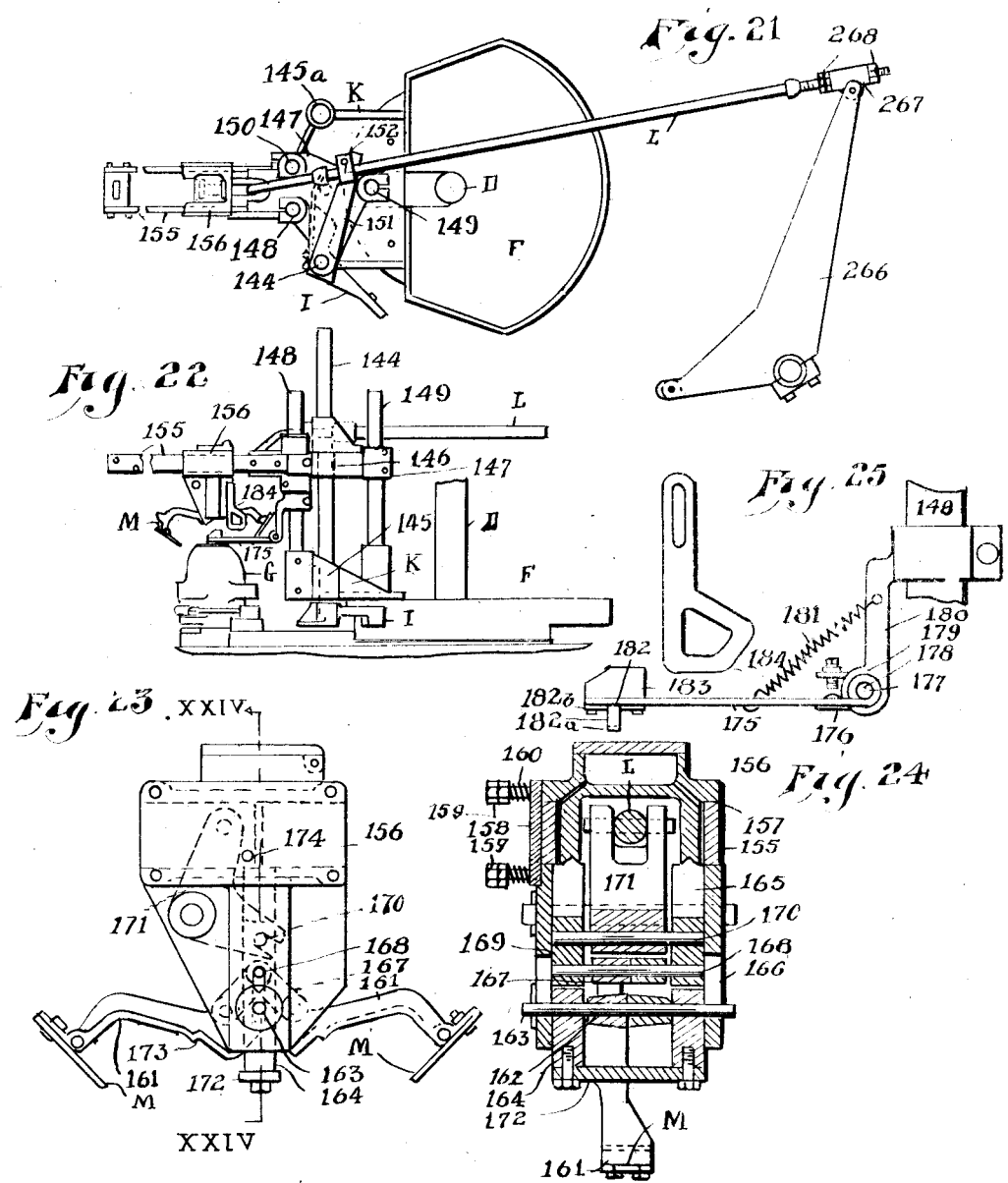

Jan. 29, 1929.  W. J. MILLER  1,700,326
GLASS FABRICATING MACHINE
Filed Dec. 26, 1922    13 Sheets-Sheet 9
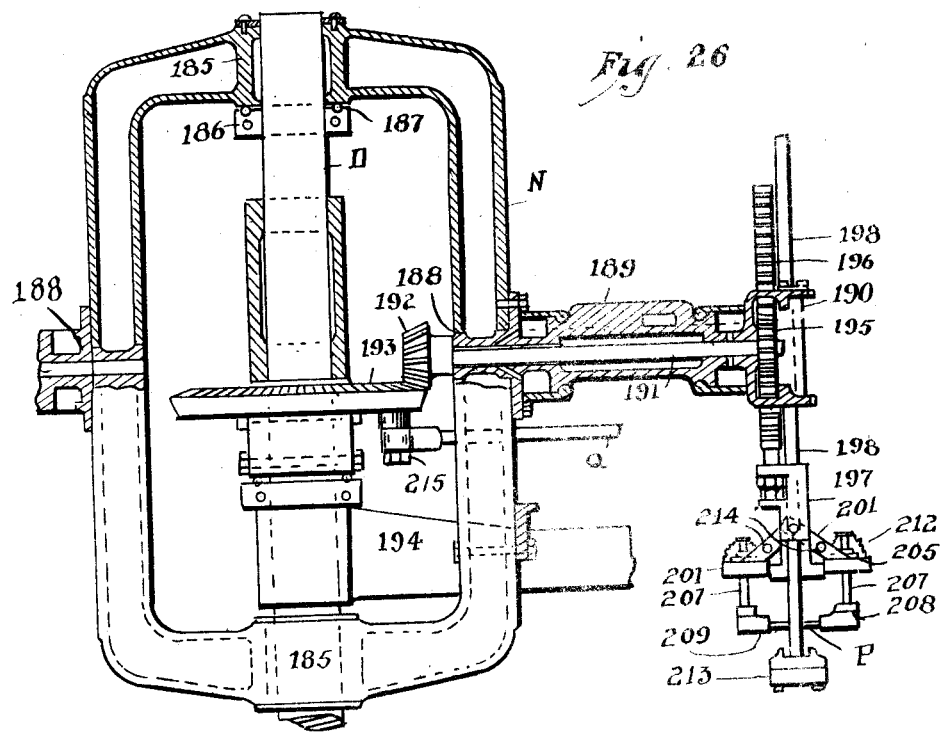
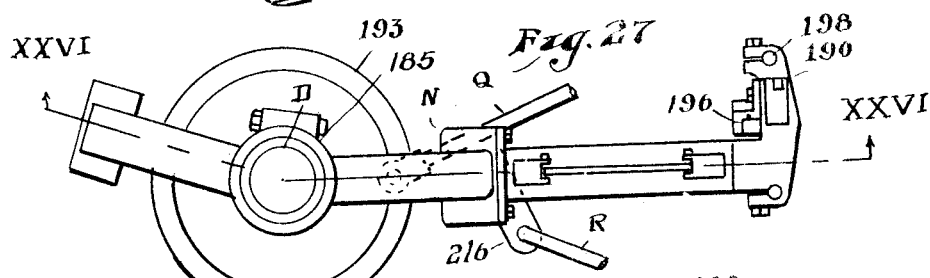
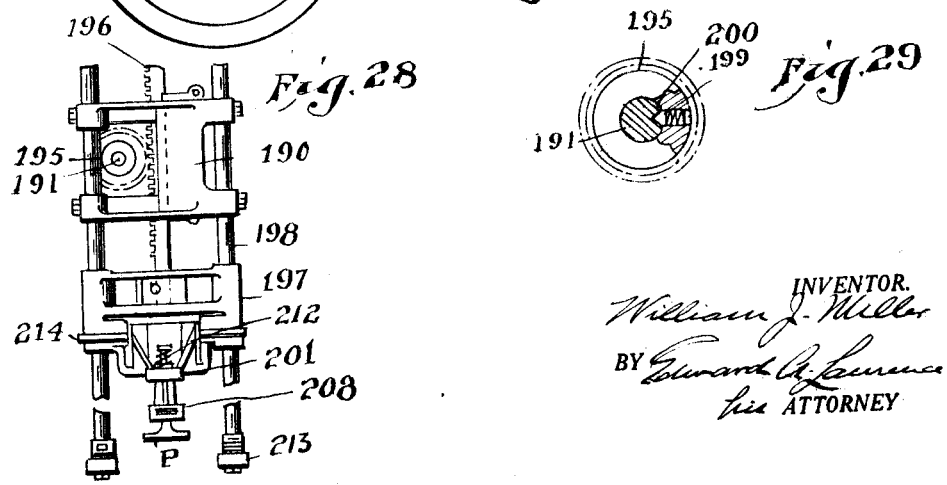

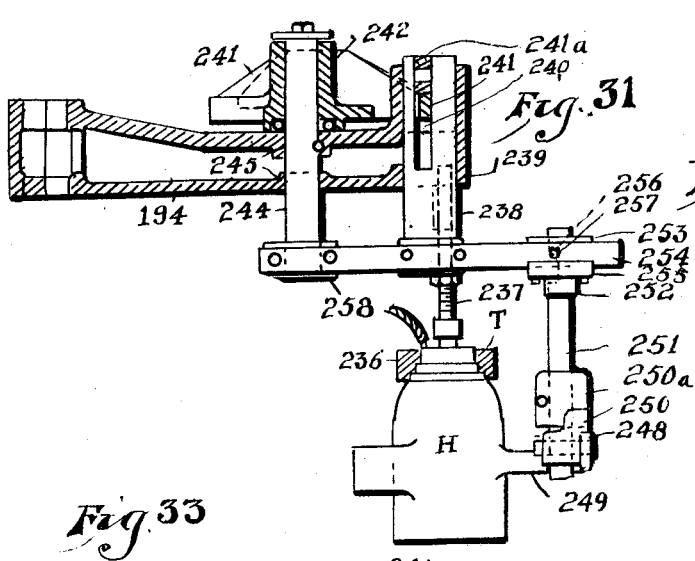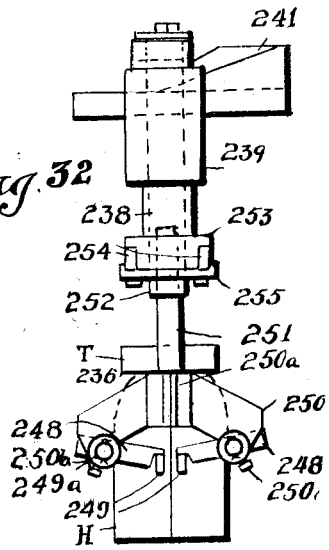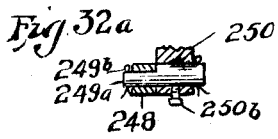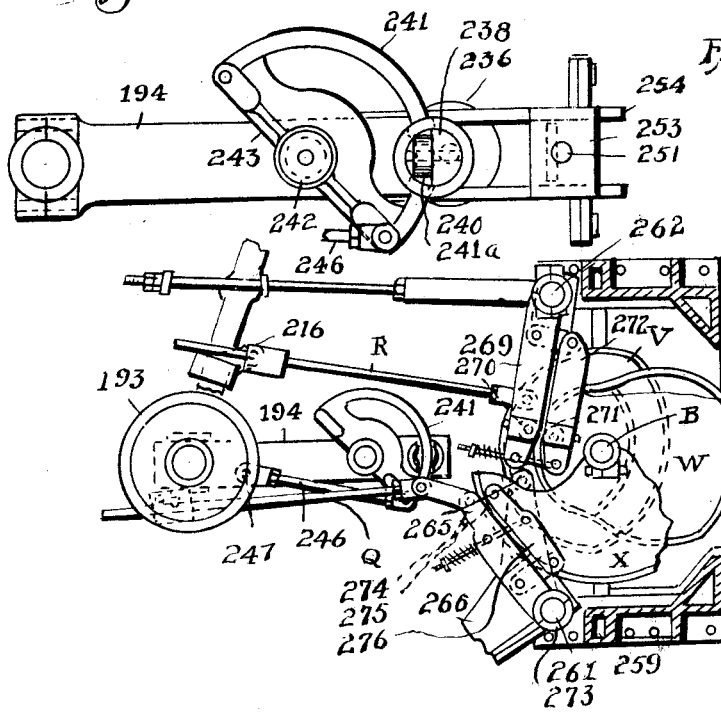

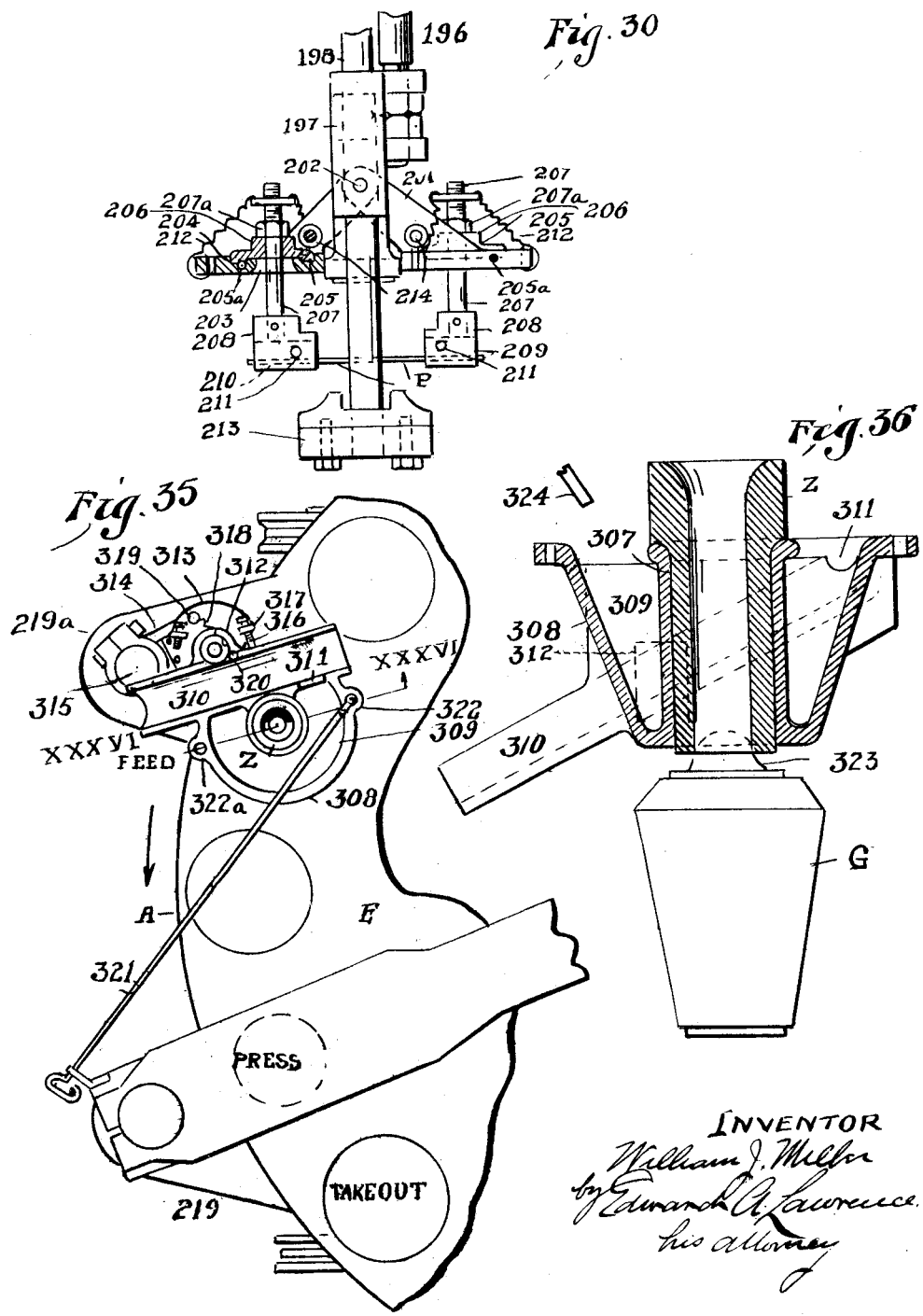

Jan. 29, 1929.  W. J. MILLER  1,700,326
GLASS FABRICATING MACHINE
Filed Dec. 26, 1922   13 Sheets-Sheet 12

INVENTOR.
William J. Miller,
BY Edward A. Lawrence
his ATTORNEY

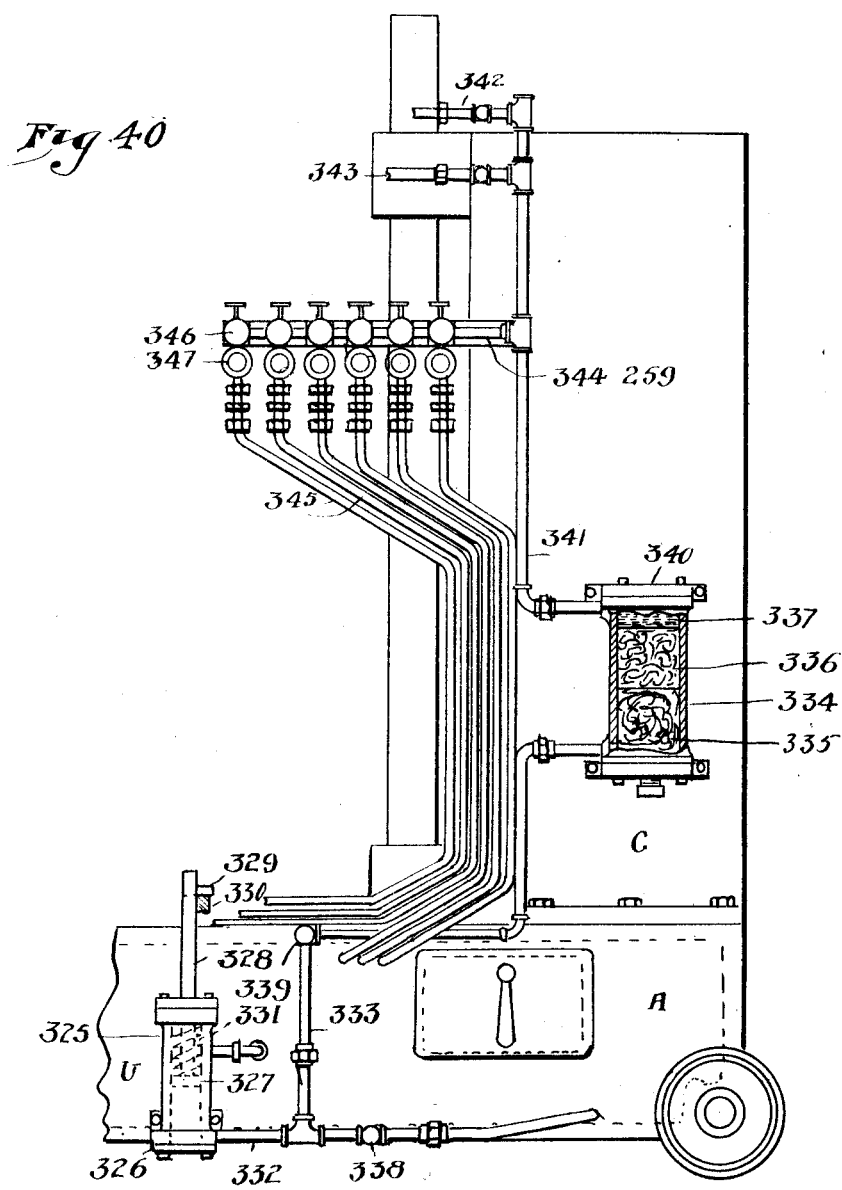

Patented Jan. 29, 1929.

1,700,326

UNITED STATES PATENT OFFICE.

WILLIAM J. MILLER, OF SWISSVALE BOROUGH, PENNSYLVANIA, ASSIGNOR, BY MESNE ASSIGNMENTS, TO WILLIAM J. MILLER, INC., OF SWISSVALE, PENNSYLVANIA, A CORPORATION OF DELAWARE.

GLASS-FABRICATING MACHINE.

Application filed December 26, 1922. Serial No. 608,976.

My machine consists of new and useful improvements in automatic machines for fabricating glass ware.

While the illustrated embodiment of the principles of my invention is more particularly intended for application to machines for blowing wide mouth bottles, many of the novel features of the invention are advantageously applicable to machines for producing narrow mouth bottles and other ware.

I show a new and improved method of power-drive for obtaining intermittent motion of the mold support.

I show a new and improved mold support or table, the same being hollow to provide internal chambers to which a cooling blast of air is supplied and from which air blasts are led, preferably by means of pipes or tubes, to the molds.

I also provide improved means for supplying both constant and intermittent air blasts to other portions of the machine, such as to the pressing plunger between pressing operations.

I also provide new and improved means for opening and closing the blow or finishing molds, and also for clamping the same closed during the blowing operation.

I provide new and improved transfer means for transferring the parisons from the parison molds to their associated blow molds.

I provide a new and improved take-off means to remove the finished ware from the blow molds.

I provide new and improved means for cleaning broken glass or imperfect blown articles from the blow molds before the transfer operation.

I provide new and improved means for operating the blowing mechanisms.

I provide new and improved cam mechanism for operating the transfer, the take-off and the blow in proper order and synchronization relative to the parison pressing and table moving means.

The machine may be used in connection with an automatic or semi-automatic feeder, or in connection with manual feeding.

I show a new and improved feeding funnel mechanism for directing the sheared gob or gather of glass into the parison molds as they are in turn spotted in the feeding position, the funnel being arranged to be swung aside, either manually or automatically, and a chute being positioned under the feed, to direct the gob or gobs of glass away from the parison molds, as where the parison mold already contains glass as it moves into the feeding position.

I show new and improved means for lubricating the machine, including a lubricant bath for the main drive and means for delivering lubricant to the various bearings, means being also provided for filtering the oil.

Other novel features of construction and arrangement of parts will appear from the following description.

Figure 39:
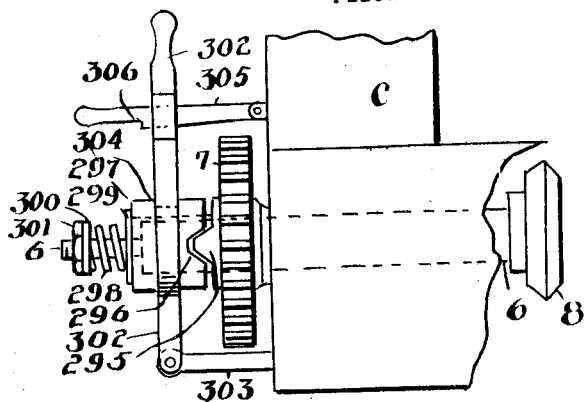
Figure 37:
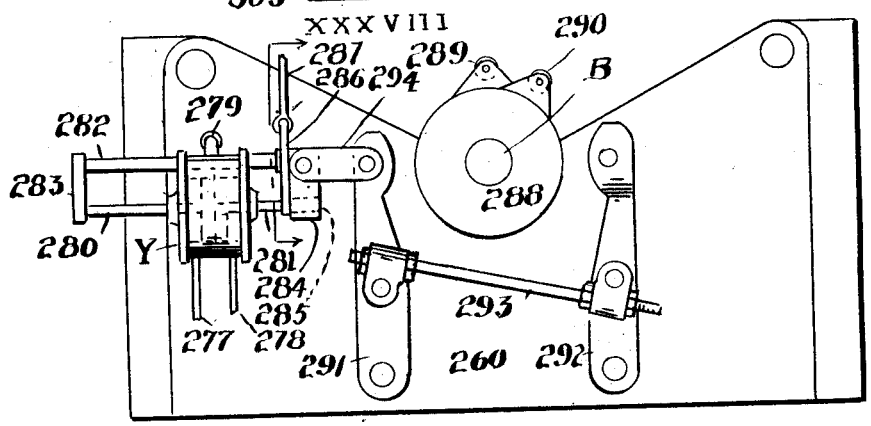
Figure 38:
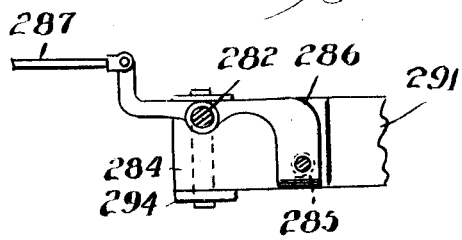

In the accompanying drawings, which are however merely intended to illustrate the practical embodiment of the principles of my invention without limiting the scope of the latter to the construction shown, Fig. 1 is a side elevation of a machine to which my invention is applied; Fig. 2 is the reverse elevation of the same; Fig. 3 is a plan view of the base or bed and the drive contained therein; Fig. 4 is a section taken along the line IV—IV in Fig. 3 but with the mold table and wind box added; Fig. 5 is a broken plan view of the mold table; Fig. 6 is a plan view of the wind box; Fig. 7 is a section taken along the line VII—VII in Fig 6; Fig. 8 is an enlarged vertical section of one of the parison molds; Fig. 9 is a side elevation of one of the blow molds mounted on the mold table; Fig. 10 is a top plan view of a blow mold and its mounting; Fig. 11 is a plan view of the mounting with the blow mold removed; Fig. 12 is a side elevation of the same; Fig. 13 is one of the parison mold stands; Fig. 14 is an elevation and Fig. 15 is a plan view of the lever which opens and closes the blow molds; Fig. 16 is a detail showing the mold table locking device; Fig. 17 is an enlarged detail of the same; Fig. 18 is an enlarged elevation showing the actuating mechanism for the striker pin of the parison molds; Fig. 19 is a broken plan view of the same; Fig. 20 is a detail showing the operating cam track for the same; Fig. 21 is a plan view showing the actuating means for the take-out; Fig. 22 is an enlarged side elevation of the take-out; Fig. 23 is an enlarged detail showing the take-out carriage and gripping fingers; Fig. 24 is a section along the line XXIV—XXIV in Fig. 23; Fig. 25 is a detail showing the means for properly presenting the ware in the blow molds to the take-off; Fig. 26 is an enlarged detail showing the transfer partially in section along the line XXVI—XXVI in Fig. 27; Fig. 27 is a top plan view of the same; Fig. 28 is an enlarged detail of the transfer looking from the right in Fig. 26; Fig. 29 is a detail showing the mounting of the transfer pinion on the shaft; Fig. 30 is an enlarged detail showing the transfer arms and fingers; Fig. 31 is an enlarged elevation of the blow head and mold locking mechanism, the supporting arm and raising and lowering cam being shown in section; Fig. 32 is a detail of the mold locking device looking from the right in Fig. 31; Fig. 32ᵃ is a detail in section of a portion of the structure shown in Fig. 32; Fig. 33 is a top plan view of the mechanism shown in Fig. 31; Fig. 34 is a top view showing the pitmen and their operating cams; Fig. 35 is an enlarged plan view showing the feeding funnel, the safety chute and their mounting; Fig. 36 is an enlarged section taken along the line XXXVI—XXXVI in Fig. 35; Fig. 37 is a top plan view of the pedestal showing the balanced valve which controls the application and relief of pressure to the pressing plunger cylinder; Fig. 38 is a detail of the same taken along the line XXXVIII—XXXVIII in Fig. 37; Fig. 39 is a broken side elevation showing the automatic power release, and Fig. 40 is a broken side elevation of the machine illustrating the automatic oiling system.

The following is a detailed description of the drawings.

The bed A of the machine is formed of a horizontally disposed casting which may be portably supported by the axles 1 and the wheels 2. The casting is perimetrally defined by a vertical flange 3, forming a boxing within which the drive is contained, and the central portion of the floor of the casting is depressed to form an oil sump 4 so that the driving elements work in an oil bath.

At its rear end is the horizontally disposed sleeve bearing 5 in which is journaled the power shaft 6, the outer end of the shaft being provided with a gear 7, or other means for applying rotary power, while the inner end of said shaft is provided with a beveled pinion 8 meshing with a beveled gear 9 on the upper portion of a vertically disposed shaft 10 which is journaled in a housing bracket 11 mounted on the bed A.

The lower portion of the shaft 10 is provided with a pinion 12 meshing with a ring gear 13 depending from its hub 14 which is rotatably mounted on the center bearing member 15 bolted to the floor of the bed A. The lower end of the vertically disposed cam shaft B is keyed in the bore of the hub member 14, and extends up through the vertically disposed pedestal C mounted on the bed A.

The ring gear 13 meshes with a like ring gear 16, of similar diameter, depending from the driving member 17 of a Geneva drive, which driving member is rotatably mounted on the center bearing member 18 bolted to the floor of the bed A. 19 is a cross member carried by the bed A, and provided on its under surface with a bearing 19ᵃ in which the hub of the member 17 is journaled. 19ᵇ and 19ᶜ are closure plates for the bed A.

20 is the annular driven member of the Geneva drive, and which is rotatably mounted on the perimeter of the annular center bearing member 21 bolted to the floor of the casting A, the bearing member 21 being provided with a circumferential shoulder 22 which supports the driven member 20 from below at the proper elevation.

The driving member 17 is provided with the usual upper and lower radial arm 23 to carry the driving roller 24 which is adapted to engage the radial slots 25 in the driven member 20, and is also provided with the arcuate portion 26 which is adapted to engage the arcuate recesses 27 in the perimeter of the driven member 20. Thus the driving member, rotating at constant speed, imparts an intermittent, or step by step, movement to the driving member 20.

Axially disposed in the member 21 is the sleeve 28 which is supported by the radial web spokes 29 integral with the member 21 and the sleeve 28.

D represents the axial standard about which the mold support revolves, and the lower end of said standard is inserted into the vertically disposed sleeve 28, being held in proper elevation by the tapered ring 30 which is seated in the beveled upper bore of the sleeve 28, and which bears upwardly against a circumferential shoulder 31 of the standard. Nuts 32 are screwed on the lower end of the standard against the lower end of the sleeve 28, thus clamping the standard rigidly in place.

The upper end of the sleeve 28 is provided with a horizontally disposed, circumferential flange 33 which loosely fits the central aperture of the circular revolving mold table E. Said table is bolted to the member 20 of the Geneva drive.

The mold table E is also rotatably supported by an anti-friction device; such as that composed of the ball bearings 34 which run in the raceway formed in the channel shaped annular track 35 supported on the bed A, and which is engaged from above by the annular concentric shoulder 36 on the underside of the table, which shoulder extends down into the track 35.

F is the wind box preferably a casting, and shaped substantially as shown in Figs. 4, 6 and 7. Said wind box is provided with a radial slot or opening 37 which permits the same to be slid into place concentrically with the standard D. The box F is bolted to the top flange 33 of the sleeve 28.

The box F is hollow, being provided with an inner chamber 38 which surrounds the center of the block in the form of an incomplete circle, and whose end walls are formed by the walls of the slot 37.

The bottom wall of the chamber 38 is partially cut away around its inner wall, as shown at 39, to maintain connection through the open ports 60 in the flange 33 with the interior of the bearing member 21. The top wall of the chamber 38 is provided with the circular openings 40, 41, 42 and 43 equally spaced apart and concentrically arranged relative to the axis of the box F.

Surrounding the chamber 38 is the similar chamber 44 whose bottom wall is provided with a concentrically arranged series of ports 45, six in number, and whose top wall is provided with a series of ports 46, 47, 48, 49 and 50 near the perimeter of the cam-block and concentric therewith.

The ports in the top of the wind box F are used to deliver air blasts for cooling purposes, such as for the pressing plunger, the parison molds, etc.

The inner portion of the table E or the portion which extends over the bearing member 21 is of less depth or thickness than the outer portion of said table. Said inner portion is provided with a series of six ports 51 arranged concentrically of the table and adapted, as the table revolves, to intermittently register with the ports 45 of the block F.

50ª represents blast pipes having their lower ends inserted in the ports in the wind box for the delivery of cooling blasts to various portions of the machine, such as the pressing plunger and the like. 50ᵇ represents plugs to close unused air ports.

The outer or deeper portion of the table E is hollow, its interior being divided into an annularly arranged series of segmental chambers 52 by the radial webs or vertical partitions 53, the inner ends of said chambers being open. The upper portion of the web spokes 29 are cut away to provide clearance for the annular gate block 54 which is movable vertically in relation to the mouths of the chambers 52, thus acting as a valve by which the mouths of said chambers may be closed or partially closed. The gate 54 is suspended by the bolts 55 depending through the holes in the wind box F and in the flange 33 of the sleeve 28, and attached to the diametrically opposed inwardly extending lugs 56 of said gate. The gate may be raised or lowered by the nuts 57 screwed on the bolts 55 against the top of the box F.

The chambers 52 are equal in number with the pairs of parison and finishing molds with which the machine is provided, shown as six, and in each case at the position on the table E of each parison mold and at the rear of the same, the top wall of the corresponding chamber 52 is provided with ports 58 leading down into said chamber, and to which ports are connected the blast pipes 59 whose hooded upper ends are arranged to direct currents of air against the upper end of the parison mold to chill the neck of the parison so that it may be safely transferred to the blow mold. The pipes 59 are preferably provided with the butterfly valves 59ª to regulate the blast of each pipe individually.

The flange 33 of the sleeve 28 is provided with a series of ports 60 which register with the cut away portion 39 of the bottom wall of the chamber 38 in the cam block F.

The lower end of the bore of the bearing member 21 registers with an aperture 61 in the bottom of the bed A, a gasket 62 being interposed between the edge of the member 21 and the bed A about said aperture to form a tight joint. 63 is a reducing ring bolted on the under side of the bed A in registration with the aperture 61, with an interposed gasket 64. 65 is a mouth ring set in the floor of the building and slotted to accommodate the cut off gate 66. The air blast pipe 67 leads into said ring 65 from below and is held in place as by set screws 68. The machine, when in position is run over the ring 64 so that its bore registers with that of the reducing ring 63. The pipe 67 is connected to a blower or compressor, not shown.

It is thus evident that the air blast is supplied to the interior of the member 21 and thence to the chambers in the table E and the wind box F, the supply of air to the chamber 44 of the box F being, however, intermittent owing to the rotation of the table E through whose ports 51 the blast is supplied to the chamber 44 of the box F.

To prevent air escaping downwardly between the bearing member 21 and the central bore of the driven member 20 of the Geneva drive, I bolt on the top of the member 21 an annular gasket 69 which overhangs the top of the driven member 20.

In practice I prefer to fill the bed A with lubricating oil up to the top of the sump 4, as indicated by the dotted line a, thereby providing a bath of oil in which the meshing members 12, 13 and 16 run, and from which oil is pumped, as will be later described to the various bearings of the machine.

Arranged in spaced relation, and in annular series about the mold table E are the parison mold stands 70 which are substantially triangular in shape, and bolted to the mold table, as at 71, with their apices disposed toward the axis of the table. Said stands are provided with raised mold seats 72 into which the bottoms of the parison molds G fit, as shown in Figs. 8 and 13.

The bottoms of said molds may be provided with a circumferential flange 73 which may be engaged from above by clips 74 held in place by bolts 75 screwed into threaded holes in the stand 70.

The stands 70 are provided with vertical ports 76 which register at their lower ends with the air ports 58 in the table E and into whose upper ends are inserted the lower ends of the stand pipes 59 above referred to, said stand pipes having hooded upper ends which direct the air blast toward the necks of the parison molds, thus chilling the necks of the parisons so that the latter may be transferred to the blow molds without crushing or distorting the parisons. The stand pipes 59 are fixed in the vertical ports 76 as by set screws. Thus the elevation of the discharge ends of the stand pipes may be regulated to suit various heights of molds.

The bodies of the mold stands 70 are recessed as at 77, said recesses communicating with the ports 76, so that the stands are kept from overheating.

The parison molds G are shown as solid, but hinged parison molds may be substituted with properly designed stands to provide for their opening and closing.

The bottoms of the parison molds are provided with circular openings 78 which extend up to the mold cavity and which accommodate the kick-up pins 79 whose enlarged heads work in the bore 80 which extends down through the stand 70, said bore being of differential diameter to provide an internal shoulder 81 which limits the downward movement of the plunger pin so that the upper end of the latter normally forms the axial bottom of the mold cavity. The extreme lower end of the pin 79 is provided with a striking boss 82.

83 is a bushing which extends down through vertically alined holes 84 in the upper and lower walls of the table E and whose enlarged head rests on the top of the table. 85 is a striker pin protruding down through the bushing 83, and which is provided with a circumferential shoulder 86 which engages an internal shoulder in the bushing and determines its lowermost position wherein its upper end just clears the boss 82 on the lower end of the pin 79. It is evident that if the lower end of the striker pin 85 is pushed upwardly, the pin 79 will be raised, elevating the parison in the mold G, so that its neck may be grasped by the jaws of the transfer device to be later described.

When a mold G assumes the transfer position, its striker pin 85 is raised by a finger 87 mounted on an arm 88 on the horizontal rock shaft 89 disposed tangentially of the path of the table E. The front end of the rock shaft is journaled in a bracket bearing 90 on the bed A while its rear end is journaled in a bearing 91 on a bracket 92 extending from said bed.

The finger 87 is pivotally mounted on the arm 88 to swing in the direction of rotation of the table, being resiliently held in its normal position against the stop pin 93 by the spring 94. Thus the finger will yield in case it accidentally gets in front of a pin 85 while the mold table is moving.

The rear end of the shaft 89 has keyed thereon the crank arm 95 whose outer end is pivotally connected by the pin 96 to a lever 97 whose other end is pivotally attached to the block 98 by the pin 99. The block 98 is provided with a pin 100 which extends into a transverse slot 101 in the lever 97. 102 represents set screws extending into the ends of the slot 101 through threaded holes in the lever 97, to engage the pin 100 and thus regulate the angle of the lever to the block.

The block 98 is provided with a hole through which passes a lever 103, said block being normally fixed on said lever by means of a spring dog 104 carried by said block and engaging a notch 105 in the lever. In case of abnormal resistance, the dog will slip from the notch, thus avoiding breakage.

The inner end of the lever 103 is attached to a rectangular frame 106 which slides in parallel track grooves in a support 107 loosely mounted on the main cam shaft B.

108 represents a hub clamped to said shaft B as by set screws and positioned below the block 107. 109 is an eccentric or cam track carried by said hub which is engaged by the roll 110 which depends from the rear of the frame 106. It is evident that as the shaft B rotates the finger 87 will be alternately raised and lowered, the action of the mechanism being timed so the finger is elevated as soon as a parison mold is spotted over the same, thus raising the parison so that its top is grasped by the jaws of the transfer. In case there is abnormal resistance to the elevation of the finger 87, the spring dog 104 will slip from its notch 105 thus avoiding breakage.

The parison raising mechanism is shown also in dotted lines in Fig. 3 in the position in which the same is installed when the mold table is arranged to rotate clockwise, instead of counterclockwise as indicated in the drawings.

111 represents the blow mold stands, one of which is mounted on the table E between adjacent parison mold stands. Said stands 111 are substantially U shape with their cavities turned outwardly to register with walled recesses 112 in the perimeter of the mold table.

H represents the portable blow molds, one of which is mounted on each of the stands 111 with its hinge pintle 113 stepped in a socket 114 in the stand to form the axis of the hinge action of the mold parts.

Each of the blow molds has a separate mold bottom 115 about which the mold closes.

Each mold bottom 115 is provided with a depending stem 116 which fits in a socket hole 117 in a block 118 which depends into the opening of the stand 111 and is provided with forwardly extending trunnions for the horizontal shaft 119 whose ends are journaled in horizontal holes in the ends of the stand 111. The trunnions have depending slotted ears 120 to one set of which is pivoted the inner end of a push rod 121 which slides in a guide slot in a bracket 122 bolted to the perimeter of the table and extending partially across the recess 112 in the perimetral edge of the table. The outer end of the push rod 121 is bifurcated to mount the anti-friction roller 123 on a vertical axis.

124 is a bent lever which is resiliently positioned in a substantially tangential position relative to the perimeter of the table with its free end extending in the direction of the table's rotation. The rear end of said lever is fixed to the upper end of a shaft 125 journaled in a vertical sleeve 126 supported from the annular track 35. The lower, protruding end of the shaft 125 is provided with a radial arm 125ᵃ connected by a spring 125ᵇ with a fixed point on the machine. The engagement of the roller 123 by the lever 124, as the table rotates, causes the push rod 121 to be shoved in, thus tilting the mold bottom outwardly. The bed A is preferably provided with a recess 126ᵃ to provide clearance for the fall of broken glass or imperfect ware when the blow mold bottom is dumped. In case the mold bottom abnormally resists tilting or movement, the effect of the spring 125ᵇ is overcome and the lever 124 is forced outwardly instead of tilting the bottom. Thus breakage is avoided.

Thus tilting of the mold bottom occurs as the blow mold moves from the take-out position, thus discharging any broken glass or imperfect ware left in the mold by the take-out. When the push rod passes out of engagement with the lever 124, owing to the movement of the mold table, the mold bottom will swing back and is properly positioned for the mold parts to close about the same, owing to the fact that the mold bottom and its carrier block is overbalanced inwardly. To prevent the mold bottom swinging inwardly beyond its proper position, I provide an adjustable stop screw 127 mounted in an angular bracket 127ᵃ extending from under the table E to the underside of which it is attached. In the drawings the machine is assumed to be operating counter-clockwise. In case of a machine operating clockwise, the lever 124 would be placed at the other side of the take-out position, the bracket 122 would be placed on the other side of the recesses 112 and the push rods would be connected to the ears on the other side of the blocks 118.

128 is a yoke member whose broad stem is grooved underneath so that the yoke slides on the parallel rails 129 in a direction radial of the table.

The outer ends of the yokes are linked to the mold parts so that a movement of the yoke member 128 toward the axis of the table will serve to open the mold while a reverse movement of the yoke will close the mold about the bottom 115. The link connection is shown as follows.

The free ends of the mold parts are provided with horizontally disposed ears 129ᵃ provided with vertical holes for the bolts 130 which pivotally attach the sleeves 131 so that the latter swing on vertical axes. 132 represents the link-rods whose threaded ends are inserted through the sleeves 131 and held in proper position therein by the inner and outer lock nuts. The other ends of said rods are squared and pivotally connected to the opposite ends of the yoke member 128 by the headed pins 133 whose lower threaded ends are screwed into threaded holes 134ᵃ on the raised abutments 134 on the ends of the yoke 128. A plurality of such holes 134ᵃ are provided in each of the ends of the yoke member, for adjusting the throw of the links. This adjustment, together with that afforded by the sleeves 131 and the lock nuts provides for different sizes and characters of portable molds.

The stem of the yoke member 128 is provided with a longitudinally disposed seat 135 in its top surface in which is seated the block 136 which is held stationary by the spring dogs 137 seated in seats 138 intersecting the seat 135 at either side and at right angles thereto, which dogs resiliently engage notches in the sides of the block 136. The seats are inclosed by the bolted-on lid plates 139 whose adjacent edges are spaced apart to provide a slot 140. The block 136 is provided with a pin 141 extending up through the slot 140, and 142 is a roller on the protruding upper end of said pin. It is evident that a force exerted against said roller to move it toward the perimeter of the table will close the mold, while a force exerted on said roller in reverse direction will result in opening the mold. In case the mold abnormally resists opening or closing when force is applied to the roller, the spring dogs 137 will slip from the notches in the sides of the block 136, thus permitting the block 136 to be shifted idly in the slot 135, without moving the yoke 128.

The blow molds are closed except when opened temporarily for the discharge of the finished ware, and are closed just before the reception of a fresh parison at the transfer position. To hold the molds closed I use the perimetral edge of the box F which is in the form of an incomplete or interrupted circle. The radius of the circle is such that as the rollers 142 pass along in engagement with the same, the yokes 128 are held in their outermost position wherein the molds H are kept closed.

Adjacent to the take out and transfer positions the perimetral circle of the box F is interrupted so as to form a cam hollow to allow clearance for the shifting of the rollers 142 toward and away from the axis of the machine, as required in opening and closing the molds.

The blow molds are in turn opened and closed by the oscillating lever I which is horizontally disposed in front of the hollow of the box F, being provided intermediate of its ends with a collar 143 which is clamped by set screws on the lower end of a vertically disposed shaft 144 which is journaled in the following manner. K is a bracket plate bolted to the box F and extending horizontally over and beyond the hollow of the latter. Said plate is provided with a vertically disposed bearing 145 through which said shaft 144 extends, the upper end of the shaft 144 protruding through a sleeve bearing 146 in a horizontally disposed frame plate 147 which is clamped to the standards 148, 149 and 150 whose lower ends are fixed in suitable sockets in the bracket plate K. In Fig. 21 it will be noted that the bracket K is provided with a bearing 145$^a$ on the opposite side from the bearing 145. This additional bearing is for the shaft 144 when the machine is assembled for a clockwise movement of the table E. In such case the frame plate 147 is mounted in a reversed position from that shown.

The upper end of the shaft 144 is provided with a radial arm 151 which is at intervals kicked inwardly toward the standard D by means of a contact block 152 on the pitman L of the take-out device. The pitman L is immediately moved outwardly, thus leaving the shaft 144 free to be rocked into its former position by a force applied to its lower end, as will be described. The front end of the lever I is provided with an inwardly bent portion which engages the blow mold rollers 142 as the molds stop in the take-out position and just before the pitman L is moved inwardly, so that, when the lever I is swung by the engagement of the block 152 with the arm 151, the roller 142 is forced inwardly toward the axis of the table, thus opening the mold to permit the take-out to seize and remove the finished ware. The lever I now becomes idle and free to rock back into its original position. This reverse movement of the lever I is caused by the next movement of the mold table, the said roller 142 coming into contact with a curved hump 153 on the inner side of the lever I, thus swinging it back to its original position. The other end of the lever I is elevated except at its extremity so that the mold roller 142 passes beneath the same and at the next stoppage of the table is spotted in front of the rear end of the lever. When the lever is again swung clockwise by the pitman L, it is evident that the rear end of the lever I will be swung outwardly, forcing out the mold roller and thus reclosing the mold.

Thus by each clockwise movement of the lever I, the blow mold spotted in the take-out position is opened to permit the take-out device to grasp and remove the finished ware, and the blow mold next in advance which is spotted in the transfer position closed just before the parison is dropped therein.

I will now proceed to describe the take-out device which removes the finished ware from the blow mold.

155 represents a pair of parallel rail bars which are bolted at their inner ends to the frame plate 147, and extend outwardly in a horizontally disposed position.

156 is a box-like carriage slidably mounted on said rails, the rails being engaged by the grooves or recesses 157 in the sides of the carriage. At one side I may use a friction plate 158 which is attached to the carriage 156 in such a manner as to span one of the rails, the plate being held resiliently against the rail by means of the bolts 159 and the springs 160, thus frictionally retarding the movement of the carriage on the rails whereby the transfer jaws are operated before the carriage begins to move.

M represents the take-out jaws of which they are a pair, each being comprised of a plate having its edge notched to fit under the neck of the finished ware, and said plates being removably attached as by bolts to the lower ends of the take-off jaw arms 161 which are of substantially the shape shown in Figs. 23 and 24, the same being provided with bearing holes 162 near their upper ends by means of which they are pivotally mounted on the cross shaft 163.

The cross shaft 163 extends through bearing holes in the sliding shoes 164 which move vertically in the vertical bores or guide-ways 165 in the carriage 156. The extremities of the shaft 163 extend into the vertical slots 166 in the sides of the carriage and the lowermost position of the shoes 164 is determined by the contact of the shaft 163 with the bottom of the slots 166. The upper ends of the arms 161 cross over and are pivotally connected by the links 167 with a shaft 168 whose ends are inserted in holes in the upper shoes 169 sliding in the guide-ways 165. 170 is a shaft connecting said upper shoes above the shaft 168. 171 is a bell crank lever pivoted at its angle to one side of the center of the carriage, and having its lower arm slotted to engage the shaft 170. The upper arm of the bell crank lever 171 is pivotally connected to the outer end of the pitman L.

The lower shoes 164 have their lower ends connected by a cross bar 172 which limits the upward movement of the shoes and consequently also of the jaws M, by contact with the lower ends of the guide-ways 165. The bar 172 also limits the closing movement of the jaws through the engagement of the shoulders 173 of the arms 161 with the sides of said bar.

In the drawings, the take-off is shown in its retracted position with its jaws spread and an open blow mold spotted under the same. It is evident that when the pitman rod L begins an outward movement the carriage 156 will not at once begin to move owing to the action of the friction plate 158, but the bell crank lever 171 will swing counter-clockwise, thus raising the shaft 170 and thereby swinging the jaws M downwardly and towards each other, so that they clasp the neck of the finished ware standing in the open mold G. As the jaws M close about the neck of the ware, the continued movement of the bell crank lever will result in raising the shaft 170 in the carriage, thus elevating the jaws and their burden. When the bell crank lever has swung to the limit of the arc determined by the contact of the bar 172 with the lower end of the guideways 165, the push exerted by the pitman L will overcome the friction between the carriage and the rails and cause the carriage to slide outwardly on the rails, with the elevated jaws carrying the suspended ware. When the pitman reaches the end of its stroke, it starts its movement in the opposite direction and its initial movement, because of the friction between the carriage and the rails, will be exerted in swinging the bell crank lever into its original position.

This will result first in lowering the shaft 170 in the carriage, thus lowering the suspended ware until the shoes 164 reach the bottom of their guide-ways, and finally spreading the jaws and thus dropping the bottle.

The bell crank lever continues to swing until it engages a stop pin 174 on the carriage, when the retreat movement of the pitman is exerted on the carriage causing it to retreat along the rails to its position above the take-off station of the blow mold, when the operation of taking out the ware is repeated, and the blow mold having been meanwhile spotted in the take-out position.

It is important that the ware be in a vertical position in the open mold so as to be properly presented to the take-off jaws. I therefore provide a pair of parallel arms 175 which are connected together at their inner ends by a cross plate 176 and are provided with pivot eyes 177, through which extend the ends of a shaft 178 horizontally disposed in a sleeve 179 carried by a bracket 180 which is clamped to the standards 148 and 150. Said arms are normally held raised by the springs 181.

182 represents a pair of opposed fingers having downturned ends 182ª which are adapted to extend into the neck of the bottle or other ware. The fingers are clamped against the under face of the arms 175 by means of the bolted on clamping plate 182ᵇ. By loosening said plates the fingers may be slid inwardly or outwardly to adjust them to different sizes of ware.

One of the arms 175 is provided with an upwardly extending block 183 which is engaged from above by the plate 184 depending from the carriage 156, said block and plate being provided with beveled corners to produce a downward wedging effect on the arms 175 as the carriage approaches its innermost position. As the carriage reaches the innermost position, the plate 184 rides off the block 183, so that the fingers 182 are raised out of contact with the ware. Thus the ware is held against tipping as the mold opens and is presented in a vertical position to the take-off jaws.

I will now proceed to describe the transfer which is used to shift the parisons from the parison molds in which they are formed to the corresponding blow molds.

N represents a substantially rectangular frame formed of two complementary parts, each having one half of the upper and the lower hubs 185 which are bolted together about the standard D to rotatably journal the frame on the standard. The frame is supported at the proper elevation on the standard by means of the collar 186 fixed on the standard D below the upper hub 185, ball bearings being preferably introduced between the hub and the collar. At opposite sides the frame N is provided with horizontally disposed sleeve bearings 188, and 189 is a radially disposed hollow arm secured to the frame at one side, its bore being in registry with the adjacent bearing 188. The side of the frame upon which the arm 189 is mounted is determined by the direction of rotation of the mold table. In the illustration the mold table is assumed to be rotating counter-clockwise. To the outer end of the arm 189 is secured the bracket 190. 191 is a horizontally disposed shaft journaled in the arm 189. The inner end of said shaft protrudes through the bearing 188 and is provided with a bevel pinion 192 meshing with a beveled gear 193 rotatably mounted on the standard D and held in the proper vertical position on said standard by the radial arm 194 fixed on said standard and to be later more fully described.

The outer end of the shaft 191 protrudes into the bracket 190 and is there provided with a pinion 195 meshing with a vertically disposed rack bar 196 slidably mounted in said bracket and having its lower end secured to a cross head 197 sliding on the guide bars 198 fixed to and depending from said bracket.

The pinion 195 is not rigidly mounted on the shaft 191 but is provided with a spring dog 199 which resiliently engages a notch 200 in the shaft 191, as shown in Fig. 29, so that in case the transfer device abnormally resists operation the pinion will slip on the shaft, and thus avoid breakage.

201 represents a pair of depending angular hinge members or arms pivotally connected to the cross head 197 by the shaft 202.

Each of said members 201 is provided with a circular opening 203 surrounded by an annular sunken seat 204 in which fits the annular bottom edge of a circular cap 205 having an upwardly extending axial hub 206. 205ª is a dowel interposed between the seat 204 and the cap 205 to prevent the latter rotating in the former. 207 represents a suspension bolt extending upwardly through said hub and held in proper relative position by the lock nut 207ª. The lower end of the bolt 207 is pinned in a socket 208 of the transfer finger clamp plates 209 in whose depending side flanges are the horizontally disposed grooves 210 to receive the edges of the transfer fingers P. The abutting edges of the transfer fingers are notched to fit around the neck of the parison. 211 are bolts which are extended through alined holes in the flanges and tightened to clamp the fingers in place.

Thus the transfer fingers are suspended from the caps 205 which are resiliently held in proper position by the helical springs 212 connecting the upper ends of the bolts 207 with opposed points of the arms 201. This provides for the proper flexibility of the transfer device, permitting the fingers to be thrust aside, but automatically returning them to their proper relative positions.

The lower ends of the guide bars 198 are provided with spreading blocks 213 having opposed inclined portions which engage the protruding ends of the cross shafts 214 carried by the hinge members, so that as the transfer fingers P are lowered, they are spread apart to grasp the parison which has been elevated by the kick-up in the bottom of the parison mold, so that the top lip or edge of the parison is raised above the mold. Said spreader blocks also serve to again spread the transfer fingers to drop the parison into the waiting blow mold.

The rack 196 is reciprocated to raise and lower the transfer jaws by the partial rotation of the gear 193, first in one direction and then in the other direction. The gear 193 is oscillated by means of a pitman Q connected at one end to the wrist pin 215 on the lower face of the gear.

The frame N is oscillated to swing at the proper time from above the parison mold to above the blow mold and then back again over the blow mold position, by means of a pitman R pivotally connected to a pierced ear 216 on the side of frame N.

I will now describe the apparatus for pressing the parisons in the parison molds.

217 is a horizontally disposed platform, preferably a casting, and provided at either end with split collars 218, by means of which the platform is clamped in place on the central standard D and also on a second standard S whose lower end is clamped in a socket 219 extending from the bed A. I also show another similar socket 249ª, one of said sockets being provided at each side of the center line of the bed A so that the standard S may be stepped in one or the other depending upon the direction in which the table E is to revolve. In the drawings the table E is assumed to revolve counter-clockwise.

The platform 217 is also provided with a socket 220 in which is fixed the upper end of the vertically depending guide shaft 221.

222 is a fluid pressure cylinder vertically disposed on the platform 217 and whose piston rod 223 depends through a vertical opening in the platform 217 and is connected to the cross head 224 sliding on the standard S and shaft 221. The cross head 224 carries the pressing bit 225 and the spring mold ring 226.

I provide means for locking the mold table in place during the pressing operation. Thus the underside of the table E is provided with a concentric series of pin holes or sockets 227 equal in number to the sets of parison and blow molds. When the table comes to a stop the socket 227, corresponding to the parison mold in which the glass is to be pressed, is engaged from below by a locking pin 228 sliding in a bore in a projection 229 on the bed A. The pin is provided with a radial wrist pin 230 protruding through a slot 231 in the wall of the bore. The protruding end of the wrist pin 230 is pivotally attached to the short end of a rocking lever 232 pivoted to the projection 229 and having its longer end connected by a link 233 with a lever 234 intermediate of the ends of the latter. One end of the lever 234 is pivoted to the platform 217 while its other end is in the upward path of a finger 235 carried by the cross head 224. It is evident that as the cross head begins to descend, the pin 228 automatically rises and engages the socket 227 which is spotted above the same. This locks the table stationary. After the parison is pressed, the elevation of the cross head, which carries the pressing bit, draws the pin down out of the socket so that the table is free to move to present another parison mold to the pressing position, another blow mold to the blowing position and another set of parison and blow molds to the transfer position and another blow mold to the take-off position. It is evident that the table remains locked until the pressing plunger approaches the top limit of its movement. Thus, if the plunger failed to rise properly or power is cut off from the plunger cylinder, the mold table remains stationary.

I will next describe the blow head and its operation.

T is the blow head of cap shape and carrying the floating lock ring 236 which fits down over the top of the blow molds to hold the mold halves together. The blow head is supplied with compressed air by any well known means adapted to automatically turn the blow on and off at the proper moments.

The blow head is mounted on the lower end of a shaft 237 which is screwed into a threaded bore in a block 238 which is mounted to slide vertically in a sleeve 239 on the outer end of the arm 194, said shaft being vertically adjustable in said block by being screwed in or out, thus enabling the position of the blow head to be adjusted to suit various heights of molds. The upper portion of the sleeve 239 is provided with vertical slots 240 to give clearance for the arcuate cam lever 241 which fits in an arcuate cross slot in the upper end of the block 238. 241ᵃ is a roller journaled on a horizontal axis in the upper end of the block 238, thus suspending the block and the blow head on the cam lever 241.

Said cam lever is connected to a concentric hub 242 by the integral spokes 243 which connect to the ends of the cam lever. The hub 242 is rotatably mounted on the protruding upper end of a shaft 244 pinned in the vertical hole 245 in the arm 194. The cam lever 241 is oscillated by means of a lever 246 connecting one end of said lever 241 with a wrist pin 247 on the hub of the oscillating gear.

Thus when a blow mold, into which a parison has been transferred is spotted in the blowing position, the blow head is lowered into engagement with the mold, the parison is blown to form the finished ware, and the blow head is elevated out of the way.

I provide means for clamping the blow mold snugly together during the blowing operation. The same consist of a pair of coacting gripping arms 248 which bear downwardly and inwardly against the projections 249 on the mold parts at either side of the division line between the same.

Said arms are pivoted at their outer ends on a yoke 250 clamped by means of its integral split collar 250ᵃ on the lower end of a rod 251 whose upper end is inserted up through a block 252 supported by its lateral top flanges 253 on the parallel horizontal supporting bars 254. 255 is a cross plate bearing against the lower edges of said bars and bolted to the block 252. Thus by loosening the bolts the block 252 may be adjusted on the bars 254. The rod 251 is provided with a longitudinally disposed recess 256 on its side which is engaged by a cross pin 257 in the block. Thus the yoke 250 has a slight vertical movement relative to its support but cannot rotate thereon. The supporting bars 254 are horizontally disposed and are supported in place by being bolted on either side of the lower end of the block 238 and also to a slip or guide collar 258 on the shaft 244 which holds the bars in proper alinement. The method of mounting the arms 248 is more clearly shown in Fig. 32ᵃ, and is as follows. 249ᵃ represents pins having cylindrical ends upon which the arms 248 are mounted being held in place by means of the cotter pins 249ᵇ. The other end of the pins 249ᵃ are of greater diameter and eccentric to the smaller ends of the pin. The larger ends of the pins are inserted in sockets in the yoke 250 and are held fast therein by the set screws 250ᵇ. By loosening the set screws and turning the pins 249ᵃ, the axes of the arms 248 may be shifted to suit varying mold requirements. It is evident that the gripping fingers are raised and lowered with the blow head, and when lowered their notched lower ends will engage the projection 249 on the mold parts and wedge the mold parts snugly together.

It is evident that the adjustments thus provided enable the mold gripping arms to be properly adjusted to suit various sizes and characters of molds and mold projections. Additional flexibility is gained by the limited vertical movement of the rod 251 relative to the block 252.

I will next describe the cam mechanism which operates the pitmen L, Q and R are actuated.

The pedestal C is provided with the side walls 259 and top 260, which is provided with the bearing 260ᵃ for the cam shaft B.

The gears 13 and 16 being of the same diameter, it is evident that the shaft B and the Geneva driving member 17 revolve at the same rate, and therefore the shaft B makes one complete revolution for each partial revolution of the mold table E.

The shaft B carries the cams, by means of which the pitmen L, Q and R are operated.

261 and 262 are a pair of vertically disposed shafts which have their lower ends stepped in sockets 263 in the pedestal C and whose upper ends are clamped in fixed sockets 264 in the top 260 of the pedestal. V, W and X are three eccentric cams rigidly mounted on the cam shaft B. The lower cam V, shown in plan in Fig. 34, controls the take-off pitman L and is provided on its under face with an eccentric track or groove engaged by a roller 265 carried by an angular lever 266 which is pivotally mounted at its angle on the shaft 262. The other end of the lever 266 is provided with a pivotally attached sleeve 267 in which the end of the pitman L is adjustably held by the lock nuts 268. Thus for each rotation of the shaft B, the take-out and the mold closing lever I complete a cycle of movement.

The cam W is next above the cam V on the shaft B and the same is shown in plan in Fig. 34. The cam W operates the pitman R which in turn oscillates the frame N. 269 is a lever pivotally mounted on the shaft 262 and having its free end provided with a roller 270 which bears against the outside of the perimetral flange of the cam W being held in resilient contact therewith by means of the complementary roller 271 mounted on the arm 272 pivotally linked to the lever 269 and spring pressed toward the same. The pitman R is pivotally attached to the outer end of the lever 269. Thus the oscillating frame N completes a cycle of operation for every revolution of the shaft B.

The top cam X operates the pitman Q which in turn oscillates the gear 193. 273 is a lever pivotally mounted on the shaft 261 and provided on its free end with a roller 274 which engages from without the depending perimetral flange of the cam X, being held in resilient engagement with the same by the inner roller 275 carried on the end of a lever 276 pivotally linked to the lever 273 and spring pressed toward the same. The outer end of the lever 273 is pivotally attached to the end of the pitman Q. Thus the transfer gear 193 completes a cycle of operation for every revolution of the shaft B.

In case the table E is to revolve clockwise, the lever 269 is mounted on the shaft 261 and the levers 266 and 273 are mounted on the shaft 262.

The cam flange of the cam W is so contoured that after having rotated the gear 193 to raise the parison, the said gear is rotated at a slower rate to compensate for the swing of the frame N, and likewise when the transfer jaw is lowered the said gear is rotated at a slower rate to compensate for the swing of the frame. Thus the gear is moved in unison with the frame and is in effect stationary relative thereto. Thus the transfer jaws are neither raised or lowered while the frame is swinging. This compensation is produced by the slightly eccentric portions W' and W² of the cam, the segment W' being used when raised and vice versa.

The admission of fluid pressure to the opposite ends of the pressing cylinder 222 is controlled by a balanced valve Y which may be mounted on the top 260 of the pedestal C, and which is connected to the upper and lower ends of the cylinder 222 by the pipes 277 and 278, respectively. Said valve is also connected to the fluid pressure supply pipe 279, and is further provided with a relief port to atmosphere. Thus by the proper movement of the valve piston, either end of the cylinder 222 may be supplied with fluid pressure and its opposite end relieved of pressure. The valve piston is assumed to be shifted toward the right in Fig. 37 to admit pressure to the lower end of the cylinder and relieve the pressure from the upper end of the same, thereby elevating the pressing plunger. On the contrary, a shift of the valve piston toward the left in Fig. 37, will admit pressure to the upper end of the cylinder and relieve the pressure from the lower end of the same, thereby depressing the plunger to press a parison.

The piston of valve Y is provided with oppositely protruding piston rods 280 and 281, the former being used to shift the piston toward the right, and the latter to shift it toward the left, in Fig. 37. 282 is a frame slidably mounted on the valve casing and provided at either end with the fingers 283 and 284 which are adapted to shift the piston rods 280 and 281, respectively. The finger 284 is provided with an aperture 285 alined with the rod 281, so that unless said aperture is blocked, the piston rod will enter said aperture and will not be shifted by the finger when the frame is shifted toward the left. 286 is an angular plate, provided with an overweighted, blade like extremity adapted to be inserted in front of the aperture 285 to block the same. The plate 286 is pivotally mounted intermediate of its ends on the frame 282 and has its lighter, upstanding end connected by a pull rod 287 to a point convenient for the operator at the front of the machine. It is evident that when the pull rod is operated to raise the heavy end of the plate 286, the aperture 285 is unblocked and the valve will not be shifted to lower the pressing plunger. However, when the rod 287 is released, the plate 286 will block the aperture 285 so that the finger 284 will shift the valve. The lower edge of the plate 286 is preferably beveled, as indicated, to facilitate its insertion between the finger and the end of the piston rod.

Thus when the operator desires to prevent the descent of the pressing plunger, he pulls the rod 287, and when he releases said rod, the plate 286 automatically resumes its operative position.

288 represents a rotary timer, shown as of the general character described in my application for Letters Patent, Serial Number 581,928, filed in the United States Patent Office on August 15th, 1922, and therefore said timer is not here shown or described in full detail. Generally speaking, however, the said timer is mounted on and revolves with the cam shaft B, and is provided with radially projected rollers 289 and 290, the former being at a lower level than the latter, and each being individually adjustable circumferentially of the timer. 291 and 292 represent a pair of actuating levers pivotally mounted on vertical axes on the top 260 of the pedestal C and having their free ends extending on either side of the timer 288. The free end of the lever 291 is in the path of the roller 289, while the free end of the lever 292 is bent or curved upwardly to clear the roller 289 and to be engaged by the roller 290. The levers are connected to swing in unison as by the adjustable link 293. The free end of the lever 291 is connected by the link 294 with the frame 282.

Thus, when the timer swings the levers toward the right in Fig. 37, the valve Y is shifted to admit pressure to the lower end of and relieve pressure from the upper end of the cylinder 22, thus raising the pressing plunger, and when the timer swings the levers toward the left, the aperture 285 being blocked by the plate 286, the valve is shifted to admit pressure to the upper end of and relieve pressure from the lower end of the cylinder 222, thus depressing the plunger to press a parison. In case the parison mold already contains a piece of hardened glass, such as an imperfect parison which the transfer device was unable to remove, the operator pulls the rod 287 and prevents the depression of the plunger.

I provide an automatic power throw off for the machine, to prevent breakage when the drive abnormally resists operation. Thus, as shown in Fig. 59, the gear 7 is loose on the shaft 6, and has its outer hub provided with angular clutch projections 295 adapted to engage the clutch recesses 296 of a collar 297 which is keyed on the outer end of the shaft 6 so as to rotate with and slide on said shaft. The collar is normally held against the hub of the gear, with their clutch members in operative engagement, by means of a helical spring 298 which is coiled about the reduced outer extremity of the shaft 6, and whose inner end bears against a washer 299 resting against the outer end of the collar 297 while the outer end of said spring bears against a washer 300 mounted on the outer end of the shaft and held in place by the nut 301 screwed on the threaded extremity of said shaft. By adjusting the nut, the power of the spring may be regulated. It is evident that abnormal resistance of the shaft 6 against rotation will result in forcing the collar 297 outwardly, permitting the disengagement of the clutch members and thus disconnecting the shaft 6 from power. The resistance required to throw out the clutch will of course depend upon the power of the spring, which may, as explained, be regulated.

I prefer to provide means for holding the clutch disengaged until the operator may remedy the trouble. Thus I provide a lever 302 pivoted at its lower end to a bracket 303 extending from the bed A, and being intermediately bifurcated to straddle the shaft 6 and engage from either side the circumferential groove 304 in the collar 297. The upper end of said lever is vertically slotted to receive the hand lever 305 whose inner end is pivoted to the pedestal C and which extends forwardly through said slot. The hand lever is provided with an angular shoulder 306 which, when the upper end of the lever 302 is thrown outwardly by the outward movement of the collar 297 when the clutch is disengaged, locks against the inner side of the lever 302 and holds it in its outward position. Thus the clutch is disengaged until the operator lifts up the hand lever 305 to disengage the shoulder 306, thus permitting the lever 302 and the collar 297 to assume their normal positions.

I provide a funnel Z to direct the gobs or gathers of glass into the parison molds at the feeding station. Such funnel may be fixed in position, but I prefer to mount the same so as to be swung to one side, either manually or automatically and to position a discharge chute under the feeder to receive the dropping gobs and prevent the deposit of glass in the parison molds when necessary.

Thus I have shown the funnel Z downwardly inserted into a socket 307 of a carrier 308 which is a casting carrying its socket surrounded by an open top water chamber 309. 310 is an inclined chute integral with the carrier 308 and adapted to receive water from the chamber 309 through a notch 311 near the upper end of the chute.

The carrier 308 is pivotally supported by means of its vertically disposed sleeve 312 which is mounted on a pin carried by a bracket plate 313 which is bolted on a bracket arm 314 clamped on the upper end of a short post 315 mounted in the socket 219ᵃ of the bed A. In case the mold table is to be rotated clockwise, instead of counterclockwise as indicated in the drawings, the post 315 is mounted in the socket 219 while the standard S is mounted in the socket 219ᵃ.

The swing of the carrier 308 is limited by the adjustable stop screws 316 screwed into threaded holes in the blocks 317 on the plate 313. 318 is a helical spring extending from a pin 319 on the plate 313 to a pin 320 on the carrier 308. The spring is so positioned that when the carrier is in intermediate position, the spring intersects the axis of the pivot, so that when the carrier moves to either side beyond the intermediate position, the spring holds the carrier against the corresponding stop pin.

321 is a pull rod pivotally connected to an eye 322 on the carrier, so that the operator may, by pulling on the rod 321, swing the carrier 308 to move the funnel Z from the path of the descending gobs and interpose the chute 310 in place to receive the gobs to direct them aside. The stop pins 316 are adjusted so that at one limit of the swing of the carrier the funnel will be above the parison mold G in the feed position, while at the other limit of the carrier's movement the funnel will be above the mold.

Thus when it is desired to prevent the parison mold from receiving a gob, the operator swings the carrier to substitute the chute in place for the funnel, thus by-passing the gob. Owing to the operation of the spring 318, the chute will retain its operative position until the operator pushes the rod 321 and restores the funnel to position.

Where the parison mold already contains glass, as it moves into the feed position, as where the previously received gob was formed into an imperfect parison that the transfer device was unable to remove, such parison, indicated at 323, in Fig. 36, as protruding from the top of the mold H, would strike against the lower portion of the funnel or the funnel carrier, and automatically swing the carrier to move the funnel out of position and the chute into position to by-pass the next gob from the parison mold.

I have shown a second pull rod eye 322ª which is used when the machine is operated clockwise.

Water is supplied from a suitable tube 324 to the water chamber 309, the overflow flowing down the chute and thus preventing the latter from heating so that glass would stick thereto. The funnel is interchangeable to suit the character of gob used for feeding.

U represents a single acting oil pump whose cylinder 325 is mounted on a bracket 326 extending from the bed A. The piston 327 of said pump is provided with an upwardly protruding piston rod 328, and 329 is a radial pin on the upper end of the same which is engaged from below by an arm 330 on the rock shaft 89. The piston is thus raised at intervals by the movement of the shaft. The piston is depressed by the spring 331 coiled about the rod 328 between the piston and the head of the cylinder. The lower end of the cylinder is connected by a pipe 332 with the oil sump 4 in the bed A. Said pipe is also connected by a pipe 333 with the bottom of a cylindrical oil filter 334 whose lower portion is provided with a layer of excelsior 335, above which is a layer of waste 336, and above the waste a layer of felt 337.

338 is a check valve in pipe 332 between the union with the pipe 333 and the sump 4, said check valve opening toward the pump. 339 is a check valve in the pipe 333 opening toward the filter. It is evident that an upward movement of the pump piston will draw oil from the sump and a downward movement of said piston will supply oil to the filter.

The filter has a removable cover 340. The upper end of the filter has a discharge pipe 341 which extends upwardly and is connected by the branch pipes 342 and 343 which lead oil to the top of the cam shaft and transfer device bearings, or other elevated bearings requiring lubrication.

The pipe 341 is also connected to a manifold 344 from which extends the tubes 345 leading to various of the machine bearings, such as those of the Geneva drive, the mold table, etc. Such tubes 345 are provided with individual valves 346; and transparent sights 347, so that the operator may discover whether or not oil is being supplied to the various surfaces in moving contact.

It will be noted that the oil is filtered before delivery, and that the supply is not under material pressure but simply a flow. In the delivery pipes the oil supply may be in drop form.

It will also be noted that the intake stroke only of the pump is positive, while the discharge stroke may be either gravity or spring actuated. Thus dangerously high oil pressures are avoided and oil is supplied simply as needed. The valves 346 provide for a drop by drop supply of lubricant to the various bearings, and the sights 347 provide means for inspection as to the oil supply.

In the operation of my machine, a parison mold receives the gob of glass when it is positioned in the feeding station. During the next movement of the mold table said parison mold is shifted into the pressing station and while the table is again stationary, the parison is pressed. The next movement of the table shifts the said parison to the transfer station wherein the parison is raised up in the parison mold and then transferred to the associated blow mold. As the said parison mold passes through the next three stations it is cooled and it then reaches the feeding station again. After the parison has been transferred to the associated blow mold at the transfer station, the said blow mold then is moved to the next station and then to the next succeeding station wherein the parison is blown to form, the parison becoming reheated in the station intermediate of the transfer station and the blow station. The blow mold with the completed ware contained therein is then moved to the next station and then to the next succeeding station, which is the feeding station of the associated parison mold in a six mold machine, the finished ware meanwhile "setting" or hardening. The next station is the take-out station for the said blow mold, being also the pressing station for the associated parison mold, the blow mold being first opened by the lever I and its ware removed by the take-out. The next station is the transfer station for the associated molds, as already described.

Although, for the sake of clearness in the description of the embodiment of the principles of my invention illustrated in the drawings, I have described the same in detail, I do not wish to limit myself thereby but claim broadly:—

1. In a glass machine, the combination of a rotary mold table, said table being interiorly chambered to contain a blast of air, means for supplying air to said table, molds mounted on said table, ports in said table adjacent to said molds, blast pipes leading from said ports and having their discharge ends directed against the molds to cool the latter, and means for regulating the height of the discharge end of said pipes to suit various characters of molds.

2. In a glass machine, the combination of a rotary mold table, molds mounted on said table, fabricating means into engagement with which the molds are brought in turn by the rotation of said table, a stationary wind box mounted coaxially with said table, means for intermittently supplying air blast to the interior of said box, and tubes leading from said box to the fabricating means to cool the latter.

3. In a glass machine, the combination of a rotary mold table, molds mounted on said table, fabricating means into engagement with which the molds are brought in turn by the rotation of said table, a stationary wind box mounted coaxially with said table, means whereby the rotation of said table intermittently admits air blast to the interior of said box, and tubular means leading from said box to the fabricating means for intermittently cooling the latter.

4. In a glass machine, the combination of a hollow support, a mold table rotatably mounted on said support, a stationary wind box fixed on said support above said mold table, means for admitting air blast to said support, means whereby the rotation of said mold table intermittently admits air from said support to the interior of said wind box, and tubular means leading from said wind box to portions of said machine to cool the same.

5. In a glass machine, the combination of a hollow support, a mold table rotatably mounted on said support, a stationary wind box mounted on said support above said table, means for admitting air blast to said support, means for admitting air blast from said support to said box, and tubular means leading from said box to portions of the machine for cooling the same.

6. In a glass machine, the combination of a hollow support, means for supplying air blast to the interior of said support, a mold table rotatably mounted on said support, a stationary wind box mounted on said support above said table, said wind box being provided with two air chambers, means for supplying air from said support to one of said chambers directly, and means whereby the rotation of said table supplies air to the other of said chambers intermittently, and tubular means leading from said chambers to portions of the machine to cool the latter.

7. In a glass machine, a driven gear, a shaft mounted axially of said gear and rotating therewith, a second gear meshing with said first gear, a Geneva-drive driving member rotating in unison with said second gear, a Geneva-drive driven member operatively engaged by said driving member, a mold table carried by said driven member, partible blow molds mounted on said table, means for opening and closing said molds after the blowing operation, a take-out device for removing the finished ware when the molds are open, means for tilting the bottoms of said molds after the removal of the ware, and cam means mounted on said shaft and rotating therewith and operatively connected to said opening and closing means and with said take-out device.

8. In a glass machine, a driven gear, a shaft mounted axially of said gear and rotating therewith, a second gear meshing with said first gear, a Geneva-drive driving member rotating in unison with said second gear, a Geneva-drive driven member operatively engaged by said driving member, a mold table carried by said drive member, partible blow molds mounted on said table, means for opening and closing said molds after the blowing operation, a take-out device for removing the finished ware when the molds are open, means for tilting the bottoms of said molds after the removal of the ware, cam means mounted on said shaft and rotating therewith and operatively connected to said opening and closing means and with said take-out device, and means whereby the movement of the mold after the take-out operation actuates said mold bottom tilting means.

9. In a glass machine, a moving mold support, partible blow molds mounted on said support, a take-out device adapted to remove the blown ware from said molds, means for intermittently rotating said support to bring said molds in turn to the take-out position, a rocking lever pivotally mounted intermediate of its ends, means for rocking said lever when a mold assumes the take-out position, and means whereby when said lever is rocked one end of said lever opens the mold in the take-out position and the other end of said lever closes the mold which has passed from the take-out position.

10. In a glass machine, a moving mold support, partible blow molds mounted on said support, a take-out device adapted to remove the blown ware from said molds, means for intermittently rotating said support to bring said molds in turn to the take-out position, a rocking lever pivotally mounted intermediate of its ends, means for rocking said lever when a mold assumes the take-out position, means whereby when said lever is rocked one end of said lever opens the mold in the take-out position and the other end of said lever closes the mold which has passed from the take-out position, and means whereby the next movement of said table resets said lever in its original position.

11. In a glass machine, a rotary mold table, partible molds concentrically arranged on said table, slidable means for opening and closing said molds comprising members operatively connected to the mold parts and movable toward the axis of said table to open said mold and movable away from the axis of said table to close the molds, means for rotating said table intermittently whereby said molds are brought in turn into the take-out position, a rocking lever pivoted intermediate of its ends and adapted to move the slidable means of the mold in the take-out position toward the axis of the table and the slidable means of the next mold in advance away from the axis of the table, and means for rocking said lever when a mold assumes the take-out position.

12. In a glass machine, a rotary mold table, partible molds concentrically arranged on said table, slidable means for opening and closing said molds comprising members operatively connected to the mold parts and movable toward the axis of said table to open said mold and movable away from the axis of said table to close the molds, means for rotating said table intermittently whereby said molds are brought in turn into the take-out position, a rocking lever pivoted intermediate of its ends and adapted to move the slidable means of the mold in the take-out position toward the axis of the table and the slidable means of the next mold in advance away from the axis of the table, means for rocking said lever when a mold assumes the take-out position, and means whereby the next movement of the table resets said lever in its original position.

13. In a glass machine, a rotary mold table, partible molds concentrically arranged on said table, slidable means provided for each of said molds for opening and closing the same, said means moving toward the axis of the table to open the mold and moving away from the axis of the table to close the same, a rocking lever pivotally mounted intermediate of its ends and adapted, when a mold assumes the take-out position, to engage with its one end the opening and closing mechanism means of said mold from without and with its other end to engage the opening and closing means of the next mold in advance from within, and means for swinging said lever whereby the mold in the take-out position is opened and the next mold in advance is closed.

14. In a glass machine, a rotary mold table, partible molds concentrically arranged on said table, slidable means provided for each of said molds for opening and closing the same, said means moving toward the axis of the table to open the mold and moving away from the axis of the table to close the same, a rocking lever pivotally mounted intermediate of its ends and adapted, when a mold assumes the take-out position, to engage with its one end the opening and closing mechanism means of said mold from without and with its other end to engage the opening and closing means of the next mold in advance from within, means for swinging said lever whereby the mold in the take-out position is opened and the next mold in advance is closed, and means whereby the next movement of the mold table resets said lever in its original position.

15. In a glass machine, the combination of a rotary mold table, partible molds concentrically arranged on said table, means for rotating the table intermittently to bring the molds in turn into the take-out position, a member coupled to the parts of each mold and slidable on said table to open and close the molds, an oscillating lever pivotally mounted intermediate of its ends and adapted to engage with its one end the member of the mold in the take-out position and to oppositely engage with its other end the member of a mold which has passed from the take-out position, and means for oscillating said lever whereby the first named mold is opened and the second named mold is closed.

16. In a glass machine, the combination of a rotary mold table, partible molds concentrically arranged on said table, means for rotating the table intermittently to bring the molds in turn into the take-out position, a member coupled to the parts of each mold and slidable on said table to open and close the molds, an oscillating lever pivotally mounted intermediate of its ends and adapted to engage with its one end the member of the mold in the take-out position and to oppositely engage with its other end the member of the mold last moved from the take-out position, means for oscillating said lever whereby the first named mold is opened and the second named mold is closed, and means whereby the next movement of the table resets said lever in its original position.

17. In a glass machine, the combination of a movable mold support, a plurality of partible molds, means for moving said table intermittently whereby the molds are brought in turn into the take-out position and in turn moved from the take-out position, a pivotally mounted lever, means whereby the movement of said lever opens the mold in the take-out position and closes the mold just moved from the take-out position, and means for swinging said lever when the support is stationary.

18. In a glass machine, the combination of a movable mold support, a plurality of partible molds mounted on said support, means for moving said support whereby the molds are brought in turn into the take-out position, means for opening the molds as they assume the take-out position, means for taking out the ware, and means for tilting the bottoms of the open molds after the ware is taken out therefrom.

19. In a glass machine, the combination of a movable mold support, a plurality of partible molds mounted on said support, means for moving said support whereby the molds are brought in turn into the take-out position, means for opening the molds as they assume the take-out position, means for taking out the ware, means for tilting the bottoms of the open molds after the ware is taken therefrom, and means whereby when said bottoms abnormally resist tilting said tilting means become inoperative.

20. In a glass machine, the combination of a movable mold support, a plurality of partible molds mounted on said support, means for moving said support whereby the molds are brought in turn into the take-out position, means for opening the molds as they assume the take-out position, means for taking out the ware, and means for tilting the bottoms of the open molds as they leave the take-out position.

21. In a glass machine, the combination of a movable mold support, a plurality of partible molds mounted on said support, means for moving said support whereby the molds are brought in turn into the take-out position, means for opening the molds as they assume the take-out position, means for taking out the ware, means for tilting the bottoms of the open molds as they leave the take-out position, and means whereby when the bottoms abnormally resist tilting said tilting means is inoperative.

22. In a glass machine, the combination of a rotary mold table, a plurality of partible molds concentrically arranged on said table, said molds being provided with tiltable bottoms, take-out means for removing the ware from said molds, means for opening the molds for the take-out, and means for tilting the bottoms of said molds before the latter are again closed.

23. In a glass machine, the combination of a rotary mold table, a plurality of partible molds concentrically arranged on said table, said molds being provided with tiltable bottoms, take-out means for removing the ware from said molds, means for opening the molds for the take-out, and means for tilting the bottoms of said molds after the ware has been removed.

24. In a glass machine, the combination of a rotary mold table, partible molds concentrically arranged on said table, separate bottoms for said molds mounted to tilt on horizontal axes, push rods connected to said mold bottoms and protruding from the table, take-out means for removing the ware from said molds, means for opening the molds in turn for the removal of the ware, and for subsequently closing the molds, and means adjacent to the table and engaged by said push rods while the molds are open whereby said mold bottoms are tilted.

25. In a glass machine, the combination of a rotary mold table, partible molds concentrically arranged on said table, separate bottoms for said molds mounted to tilt on horizontal axes, push rods connected to said mold bottoms and protruding from the table, take-out means for removing the ware from said molds, means for opening the molds in turn for the removal of the ware, and for subsequently closing the molds, means adjacent to the table and engaged by said push rods while the molds are open whereby said mold bottoms are tilted, and means whereby when a mold bottom abnormally resists tilting said last mentioned means yields to prevent breakage.

26. In a glass machine, the combination of a rotary mold table, partible molds concentrically arranged on said table, separate bottoms for said molds mounted to tilt on horizontal axes, push rods connected to said mold bottoms and protruding from the table, take-out means for removing the ware from said molds, means for opening the molds in turn for the removal of the ware, and for subsequently closing the molds, resiliently presented means adjacent to the table and engaged by said push rods while the molds are open whereby said mold bottoms are tilted, and means whereby when a mold bottom abnormally resists tilting said last mentioned means yields to prevent breakage.

27. In a glass machine, the combination of a rotary mold table, partible molds concentrically arranged on said table, said molds being provided with tiltable bottoms, means for opening and closing said molds, take-out means for removing the ware from the open molds, and means actuated by the movement of the table for tilting the bottoms after the removal of the ware.

28. In a glass machine, the combination of a rotary mold table, partible molds concentrically arranged on said table, said molds being provided with tiltable bottoms, means for opening and closing said molds, take-out means for removing the ware from the open molds, means actuated by the movement of the table for tilting the bottoms after the removal of the ware, and means whereby said last mentioned means are inoperative when a bottom abnormally resists tilting.

29. In a glass machine, a rotary mold table, partible molds concentrically arranged on said table, separate bottoms for said molds tiltable on horizontal axes, means for opening said molds at the take-out position, means for taking-out the blown ware, means for tilting said bottoms as the molds leave the take-out position, said bottoms being arranged to automatically return to their upright position, and means for reclosing the molds.

30. In a glass fabricating machine characterized by a movable mold support and a plurality of pairs of molds, each pair comprising a parison mold and a blow mold, mounted on said support, a transfer device comprising a support pivotally mounted on a vertical axis, a gear pivotally mounted coaxially with said support, a shaft horizontally journaled in said support, a pinion on one end of said shaft meshing with the said gear, a vertically slidable rack mounted on said support, a pinion on the other end of said shaft meshing with said rack, parison grasping tongs moving in unison with said rack, means for oscillating said support to move the tongs from one mold of a pair to the other, and means for oscillating said gear to raise and lower the tongs.

31. In a glass fabricating machine characterized by a movable mold support and a plurality of pairs of molds, each pair comprising a parison mold and a blow mold, mounted on said support, a transfer device comprising a support pivotally mounted on a vertical axis, a gear pivotally mounted coaxially with said support, a shaft horizontally journaled in said support, a pinion on one end of said shaft meshing with the said gear, a vertically slidable rack mounted on said support, a pinion on the other end of said shaft meshing with said rack, parison grasping tongs moving in unison with said rack, means for oscillating said support to move the tongs from one mold of a pair to the other, means for oscillating said gear to raise and lower the tongs, and means whereby when said tongs reach their lowermost position they are spread apart.

32. In a glass fabricating machine characterized by a movable mold support and a plurality of pairs of molds, each pair comprising a parison mold and a blow mold, mounted on said support, a transfer device comprising a support pivotally mounted on a vertical axis, a gear pivotally mounted coaxially with said support, a shaft horizontally journaled in said support, a pinion on one end of said shaft meshing with the said gear, a vertically slidable rack mounted on said support, a pinion on the other end of said shaft meshing with said rack, parison grasping tongs moving in unison with said rack, means for oscillating said support to move the tongs from one mold of a pair to the other, means for oscillating said gear to raise and lower the tongs, and means whereby in case of abnormal resistance to raising or lowering said tongs the power is automatically relieved from said rack.

33. In a glass fabricating machine characterized by a movable mold support and a plurality of pairs of molds, each pair comprising a parison mold and a blow mold, mounted on said support, a transfer device comprising a support pivotally mounted on a vertical axis, a gear pivotally mounted coaxially with said support, a shaft horizontally journaled in said support, a pinion on one end of said shaft meshing with the said gear, a vertically slidable rack mounted on said support, a pinion on the other end of said shaft meshing with said rack, parison grasping tongs moving in unison with said rack, means for oscillating said support to move the tongs from one mold of a pair to the other, means for oscillating said gear to raise and lower the tongs, and means whereby in case of abnormal resistance to raising or lowering said tongs the power is automatically relieved from said transfer means.

34. In a glass fabricating machine characterized by a movable mold support and a plurality of pairs of molds, each pair comprising a parison mold and a blow mold, mounted on said support, a transfer device consisting of a horizontally journaled shaft, means for rotating said shaft on its axis, means for swinging said shaft in a horizontal plane with its driven end as an axis, a vertically disposed rack, a pinion on the outer end of said shaft meshing with said rack, and parison grasping jaws carried by said rack.

35. In a glass machine, means for removing a glass article from a mold comprising, a support mounted to swing on a vertical axis, a shaft horizontally journaled in said support, means coaxial with said support for rotating said shaft, a pinion on the outer end of said shaft, a vertically disposed rack meshing with said pinion, grasping jaws carried by the rack, means for oscillating said support, and means for rotating said shaft in either direction.

36. In a glass machine, means for removing a glass article from a mold comprising, a support mounted to swing on a vertical axis, a shaft horizontally journaled in said support, means coaxial with said support for rotating said shaft, a pinion on the outer end of said shaft, a vertically disposed rack meshing with said pinion, grasping jaws carried by the rack, means for oscillating said support, means for rotating said shaft in either direction, and means whereby said jaws are spread apart when they reach their lowermost position.

37. In means for removing glass articles from a mold, a pair of pivotally supported arms, provided on their free ends with circular openings, caps mounted on said arms and covering said openings, grasping jaws, bolts from which said jaws are suspended extending through said caps, and resilient means for centering said caps relative to said openings.

38. In means for removing glass articles from a mold, a pair of pivotally supported arms, grasping jaws loosely suspended from said arms, and resilient means for holding said jaws in proper alignment with said arms.

39. In a glass machine, a movable support, a plurality of molds mounted on said support and brought in turn into the take-out position by the movement of said support, take-out means adapted to grasp the ware when elevated in said molds, a kick-up pin in the bottom of each of said molds, means oscillating on a horizontal axis at the take-out position and adapted to elevate said kick-up pins, and means whereby said oscillating means will yield in the direction of movement of said support when laterally engaged by a kick-up pin.

40. In a glass machine, the combination of a movable mold support, a plurality of molds mounted on said support and arranged to be brought in turn into the article-removing position by the movement of the mold support, kick-up means in the bottom of each of said molds for elevating the articles for their removal, and means moving in a substantially vertical plane and arranged to engage from below and to operate said kick-up means, said last mentioned means being arranged to yield in the direction of the movement of the mold support in case of lateral engagement with the kick-up means.

41. In a glass machine, the combination of a movable mold support, a plurality of molds mounted on said support and arranged to be brought in turn into the article-removing position by the movement of the mold support, kick-up means in the bottom of each of said molds for elevating the articles for their removal, a lever oscillating on a substantially horizontal axis, and a finger carried by said lever and arranged to engage from below and operate said kick-up means, said finger being yieldable in the direction of the movement of said support when laterally engaged by the kick-up means.

42. In a glass machine, the combination of a movable mold support, a plurality of molds mounted on said support and arranged to be brought in turn into the article-removing position by the movement of the mold support, kick-up means in the bottom of each of said molds for elevating the articles for their removal, a lever oscillating on a substantially horizontal axis, a finger carried by said lever and adapted to engage from below and elevate the kick-up means, said lever being arranged to swing in the direction of the movement of the mold support when laterally engaged by a kick-up means, and resilient means to return said finger to and retain it in its normal relation to the lever.

Signed at Pittsburgh, Pa., this 20th day of December, 1922.

WILLIAM J. MILLER.